US011727198B2

(12) United States Patent
Olsen et al.

(10) Patent No.: US 11,727,198 B2
(45) Date of Patent: Aug. 15, 2023

(54) ENTERPRISE WRITING ASSISTANCE

(71) Applicant: Microsoft Technology Licensing, LLC, Redmond, WA (US)

(72) Inventors: Mari Olsen, Bellevue, WA (US); Michael Koenig, Bellevue, WA (US); Kyle Von Haden, Leopardstown (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/270,563

(22) Filed: Sep. 20, 2016

(65) Prior Publication Data

US 2017/0220535 A1 Aug. 3, 2017

Related U.S. Application Data

(60) Provisional application No. 62/289,805, filed on Feb. 1, 2016, provisional application No. 62/289,856, filed
(Continued)

(51) Int. Cl.
*G06F 40/166* (2020.01)
*G06F 9/451* (2018.01)
(Continued)

(52) U.S. Cl.
CPC .......... *G06F 40/166* (2020.01); *G06F 3/0482* (2013.01); *G06F 3/167* (2013.01);
(Continued)

(58) Field of Classification Search
CPC ........ G06F 17/24; G06F 17/25; G06F 40/166; G06F 9/453; G06F 40/109; G06F 40/253;
(Continued)

(56) References Cited

U.S. PATENT DOCUMENTS 4,859,091 A 8/1989 Ueda
5,678,053 A 10/1997 Anderson
(Continued)

FOREIGN PATENT DOCUMENTS

EP 0093249 11/1983

OTHER PUBLICATIONS

Anonymous, "After the Deadline (Extension for OpenOffice.org)", Aug. 22, 2010, retrieved from the internet on Apr. 11, 2017 at: http://web.archive.org/web/20100822031718/http://www.afterthedeadline.com/download.slp?platform=OpenOffice, 3 pgs.
(Continued)

*Primary Examiner* — Michael Roswell
*Assistant Examiner* — Jenq-Kang Chu
(74) *Attorney, Agent, or Firm* — Novo TechIP International PLLC

(57) ABSTRACT

The present disclosure is directed to systems, methods and devices for providing customizable enterprise-based policy for managing document content. Text from documents being authored and edited may be processed by one or more natural language processing and machine learning modules and a determination may be made that one or more enterprise rules relating to processed text are implicated. Properties from documents being authored and edited may be processed. Recommendations based on the one or more implicated enterprise rules may be provided to a document author to provide an enhanced reader experience and to increase the document's effectiveness or alignment to a common voice or standards amongst the content group. Analytics relating to a plurality of enterprise documents may be provided as they relate to document effectiveness or alignment to a prescribed voice or standards.

19 Claims, 14 Drawing Sheets

Related U.S. Application Data on Feb. 1, 2016, provisional application No. 62/289,866, filed on Feb. 1, 2016.

(51) Int. Cl.

| | | |
|---|---|---|
| *G06F 40/47* | (2020.01) | |
| *G06F 40/109* | (2020.01) | |
| *G06F 40/117* | (2020.01) | |
| *G06F 40/232* | (2020.01) | |
| *G06F 40/247* | (2020.01) | |
| *G06F 40/253* | (2020.01) | |
| *G06F 40/295* | (2020.01) | |
| *G06F 3/0482* | (2013.01) | |
| *G06F 3/16* | (2006.01) | |

(52) U.S. Cl.
CPC ............ *G06F 9/453* (2018.02); *G06F 40/109* (2020.01); *G06F 40/117* (2020.01); *G06F 40/232* (2020.01); *G06F 40/247* (2020.01); *G06F 40/253* (2020.01); *G06F 40/295* (2020.01); *G06F 40/47* (2020.01)

(58) Field of Classification Search
CPC ...... G06F 40/47; G06F 40/247; G06F 40/232; G06F 40/295; G06F 40/117; G06F 3/0482; G06F 3/167; G06T 11/60; A63F 2300/5553; A63F 2300/6623
USPC ................................. 715/201, 202, 230, 255
See application file for complete search history.

(56) References Cited

U.S. PATENT DOCUMENTS

| | | | |
|---|---|---|---|
| 5,960,447 A | 9/1999 | Holt et al. | |
| 6,085,206 A | 7/2000 | Domini et al. | |
| 6,175,834 B1 | 1/2001 | Cai et al. | |
| 6,199,081 B1* | 3/2001 | Meyerzon | G06F 40/151 |
| | | | 715/256 |
| 6,583,798 B1 | 6/2003 | Hoek et al. | |
| 6,611,802 B2 | 8/2003 | Lewis et al. | |
| 6,889,361 B1 | 5/2005 | Bates et al. | |
| 6,918,086 B2 | 7/2005 | Rogson | |
| 7,260,773 B2 | 8/2007 | Zernik | |
| 7,424,674 B1 | 9/2008 | Gross et al. | |
| 7,752,034 B2 | 7/2010 | Brockett et al. | |
| 7,778,816 B2 | 7/2010 | Reynar | |
| 7,908,132 B2 | 3/2011 | Brockett et al. | |
| 8,078,451 B2 | 12/2011 | Dolan et al. | |
| 8,136,037 B2 | 3/2012 | Adams et al. | |
| 8,392,390 B2 | 3/2013 | Bennett et al. | |
| 8,645,124 B2 | 2/2014 | Zangvil | |
| 8,886,735 B1 | 11/2014 | Liu et al. | |
| 8,903,719 B1 | 12/2014 | Landry et al. | |
| 8,914,278 B2 | 12/2014 | Zangvil | |
| 9,002,700 B2 | 4/2015 | Hoover et al. | |
| 9,015,036 B2 | 4/2015 | Zangvil | |
| 9,026,432 B2 | 5/2015 | Zangvil | |
| 9,436,676 B1 | 9/2016 | Korn | |
| 9,459,846 B2* | 10/2016 | Bornheimer | G06F 8/77 |
| 9,465,793 B2 | 10/2016 | Hoover | |
| 9,665,559 B2 | 5/2017 | Gross et al. | |
| 9,672,203 B1 | 6/2017 | Bhar | |
| 2003/0004716 A1 | 1/2003 | Haigh et al. | |
| 2004/0030540 A1 | 2/2004 | Ovil et al. | |
| 2004/0153466 A1 | 8/2004 | Ziff et al. | |
| 2004/0249630 A1 | 12/2004 | Parry et al. | |
| 2005/0125215 A1 | 6/2005 | Wu et al. | |
| 2006/0123329 A1 | 6/2006 | Steen et al. | |
| 2006/0143564 A1 | 6/2006 | Bates et al. | |
| 2006/0212441 A1 | 9/2006 | Tang et al. | |
| 2006/0247914 A1 | 11/2006 | Brener | |
| 2006/0282413 A1 | 12/2006 | Bondi | |
| 2007/0067294 A1 | 3/2007 | Ward et al. | |
| 2008/0071612 A1 | 3/2008 | Mah et al. | |
| 2008/0077570 A1 | 3/2008 | Tang et al. | |
| 2008/0195379 A1 | 8/2008 | Vanderwold et al. | |
| 2008/0208567 A1 | 8/2008 | Brockett et al. | |
| 2009/0006950 A1 | 1/2009 | Gross et al. | |
| 2009/0055761 A1 | 2/2009 | Basson et al. | |
| 2009/0171649 A1 | 7/2009 | Kishore et al. | |
| 2009/0235159 A1* | 9/2009 | Hosoda | G06F 40/14 |
| | | | 715/235 |
| 2009/0319927 A1 | 12/2009 | Beeman et al. | |
| 2010/0228365 A1 | 9/2010 | Chrobok-Diening et al. | |
| 2010/0257182 A1* | 10/2010 | Saliba | G06F 40/253 |
| | | | 707/747 |
| 2010/0275118 A1 | 10/2010 | Iakobashvili et al. | |
| 2010/0286979 A1 | 11/2010 | Zangvil | |
| 2011/0035364 A1 | 2/2011 | Lipsey | |
| 2011/0055192 A1 | 3/2011 | Tang et al. | |
| 2011/0086331 A1 | 4/2011 | Zangvil | |
| 2011/0191105 A1 | 8/2011 | Spears | |
| 2011/0313757 A1* | 12/2011 | Hoover | G06F 40/205 |
| | | | 704/9 |
| 2012/0297294 A1 | 11/2012 | Scott et al. | |
| 2013/0006613 A1 | 1/2013 | Zangvil | |
| 2013/0055074 A1 | 2/2013 | Trese et al. | |
| 2013/0073531 A1* | 3/2013 | Robinson | G06Q 10/06 |
| | | | 707/694 |
| 2013/0179169 A1 | 7/2013 | Sung et al. | |
| 2013/0226927 A1 | 8/2013 | Verma et al. | |
| 2014/0032683 A1 | 1/2014 | Maheshwari et al. | |
| 2014/0122062 A1 | 5/2014 | Zangvil | |
| 2014/0282837 A1 | 9/2014 | Heise et al. | |
| 2014/0288915 A1 | 9/2014 | Madnani et al. | |
| 2014/0289617 A1 | 9/2014 | Rajagopalan | |
| 2014/0342341 A1 | 11/2014 | Rea | |
| 2015/0104763 A1 | 4/2015 | Hausmann | |
| 2015/0149876 A1 | 5/2015 | Davis et al. | |
| 2015/0154174 A1 | 6/2015 | Hoover | |
| 2015/0199318 A1* | 7/2015 | Lemonik | G06Q 10/101 |
| | | | 715/255 |
| 2015/0220509 A1 | 8/2015 | Zangvil | |
| 2015/0309983 A1 | 10/2015 | Hoover | |
| 2016/0087925 A1 | 3/2016 | Kalavagattu et al. | |
| 2016/0103808 A1 | 4/2016 | Anders et al. | |
| 2016/0162473 A1 | 6/2016 | Cogley et al. | |
| 2016/0246772 A1 | 8/2016 | Hoover | |
| 2016/0371248 A1 | 12/2016 | Hoover | |
| 2017/0220360 A1 | 8/2017 | Chiba et al. | |
| 2017/0220535 A1 | 8/2017 | Olsen | |
| 2017/0220536 A1 | 8/2017 | Chiba et al. | |
| 2017/0329872 A1 | 11/2017 | Dispensa et al. | |
| 2018/0067912 A1 | 3/2018 | Deluca et al. | |

OTHER PUBLICATIONS

PCT International Search Report and Written Opinion in International Application PCT/US2017/015537, dated May 2, 2017, 14 pgs.
PCT International Search Report and Written Opinion in International Application PCT/US2017/015538, dated May 4, 2017, 13 pgs.
PCT International Search Report and Written Opinion in International Application PCT/US2017/016049, dated Jan. 21, 2017, 18 pgs.
"Find Inconsistencies in Your Writing", Available at: https://prowritingaid.com/art/14/Find-inconsistencies-in-your-writing.aspx, Apr. 7, 2012, 5 pages.
"Frontlab Proofing—Solutions", Available at: http://www.frontlab.com/proofing/solutions.aspx, Mar. 9, 2016, 3 pages.
"Grammarly", Available at: https://www.grammarly.com/spell-check, Jan. 15, 2016, 11 pages.
"MST Redact", Available at: http://www.ms-technology.com/viewing-solutions/redact/#HyPerLink_format, Mar. 9, 2016, 2 pages.
"Proofreading Support", Available at: https://en.support.wordpress.com/proofreading/, Feb. 2, 2016, 6 pages.
"Smart Translate", Available at: http://www.2x4.de/#!smart-translate/mptfb, Mar. 9, 2016, 6 pages.

(56) References Cited

OTHER PUBLICATIONS

"StyleWriter Professional Writing and Editing Software Features", Available at: http://www.editorsoftware.com/StyleWriter_Features.html#professional_proofreading_editing_writing_software, Aug. 9, 2013, 3 pages.

"Understanding Proofreading and Copyediting", Available at: http://www.avsgroup.com/articles/articletype/articleview/articleid/20/proofreading-and-copyediting, Feb. 13, 2015, 1 page.

Agrawal, Harsh, "5 Free Online Proofreader Tools for Error-Free Writing", Available at: http://www.shoutmeloud.com/online-proofreading-tools-english-writing.html, Mar. 17, 2015, 7 pages.

Kukich, Karen, "Techniques for Automatically Correcting Words in Text", In Journal of ACM Computing Surveys, vol. 24, Issue 4, Dec. 1992, 63 pages.

Mapue, Joseph, "50 Best Microsoft Word Add-ins: Take Documents from Awful to Awesome", Available at: http://www.skilledup.com/articles/50-best-microsoft-word-add-ins, Jul. 23, 2014, 13 pages.

Mastykarz, Waldek, "Easy search and replace with Mavention Search and Replace", Available at: https://blog.mastykarz.nl/spell-checking-brand-names-mavention-spell-check/, Sep. 29, 2012, 8 pages.

Matt, "How to Stop Word 2010 from Underlining Misspelled Words", Available at: http://www.solveyourtech.com/how-to-stop-word-2010-from-underlining-misspelled-words/, May 4, 2015, 7 pages.

McCandlish, Stanton, "EFF's Top 12 Ways to Protect Your Online Privacy", Available at: https://www.eff.org/wp/effs-top-12-ways-protect-your-online-privacy, Apr. 2002, 10 pages.

Schwartz, Steve, "Getting Started with Word 2013", Available at: http://www.peachpit.com/articles/article.aspx?p=2044335&seqNum=7, Apr. 22, 2013, 7 pages.

U.S. Appl. No. 15/354,381, Office Action dated Jan. 9, 2018, 21 pages.

"Final Office Action Issued in U.S. Appl. No. 15/354,381", dated Aug. 9, 2018, 23 Pages.

"Non Final Office Action Issued in U.S. Appl. No. 15/344,283", dated Jan. 10, 2019, 31 Pages.

"Non Final Rejection Issued in U.S. Appl. No. 15/354,381", dated Jan. 25, 2019, 24 Pages.

"Non Final Office Action Issued in U.S. Appl. No. 15/354,381", dated Jan. 14, 2020, 26 Pages.

"Microsoft Word 2013 An Essential Guide", Retrieved From: http://www.reading.ac.uk/web/files/its/WordEssen13.pdf, 2014, 17 Pages.

"Non Final Office Action Issued in U.S. Appl. No. 15/344,283", dated Dec. 9, 2019, 35 Pages.

"Final Office Action Issued in U.S. Appl. No. 15/344,283", dated Jul. 9, 2019, 34 Pages.

"Final Office Action Issued in U.S. Appl. No. 15/354,381", dated Aug. 22, 2019, 25 Pages.

"Final Office Action Issued In U.S. Appl. No. 15/344,283", dated Jun. 25, 2020, 10 Pages.

"Final Office Action Issued in U.S. Appl. No. 15/354,381", dated Apr. 12, 2021, 30 Pages.

"Notice of Allowance Issued in U.S. Appl. No. 15/354,381", dated Jun. 28, 2021, 7 Pages.

\* cited by examiner

FIG. 5

ENTERPRISE WRITING ASSISTANCE

CROSS-REFERENCE TO RELATED APPLICATIONS

This application claims the benefit of U.S. Provisional Patent Application Ser. No. 62/289,805, entitled "ENTERPRISE WRITING ASSISTANCE", filed Feb. 1, 2016, the entirety of which is hereby incorporated by reference.

Details regarding the present disclosure are also provided in U.S. Provisional Patent Application Ser. No. 62/289,856, entitled "PROOFING TASK PANE", filed Feb. 1, 2016; and U.S. Provisional Patent Application Ser. No. 62/289,866, entitled "CONTEXTUAL MENU WITH ADDITIONAL INFORMATION TO HELP USER CHOICE", filed Feb. 1, 2016, the entireties of which are hereby incorporated by reference.

BACKGROUND

Word processing applications typically analyze a document to identify spelling errors and grammar issues that may exist therein. The document text is typically analyzed against a standard dictionary and standard grammar rules. Accordingly, an enterprise or an individual user must manually review each document based on additional rules under which the enterprise or the user may require the document to be assessed. It is with respect to these and other general considerations that aspects of the present disclosure have been made. Additionally, although relatively specific problems are discussed, it should be understood that the aspects should not be limited to solving only the specific problems identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods and devices for assisting selectively managing document editing for an enterprise, comprising: providing a customizable enterprise-based policy for managing document content, the enterprise-based policy comprising a plurality of document editing rules contingent on a definable set of enterprise characteristics; inspecting a first document; inspecting one or more properties related to the first document; comparing the one or more properties related to the first document to the plurality of document editing rules; and applying, based on a definable set of enterprise characteristics associated with the first document and the one or more properties related to the first document, a specific rule from the plurality of document editing rules.

BRIEF DESCRIPTION OF THE DRAWINGS

FIG. 5 illustrates an example word processing document that was analyzed against one or more customizable guidelines.

DETAILED DESCRIPTION

Figure 1:
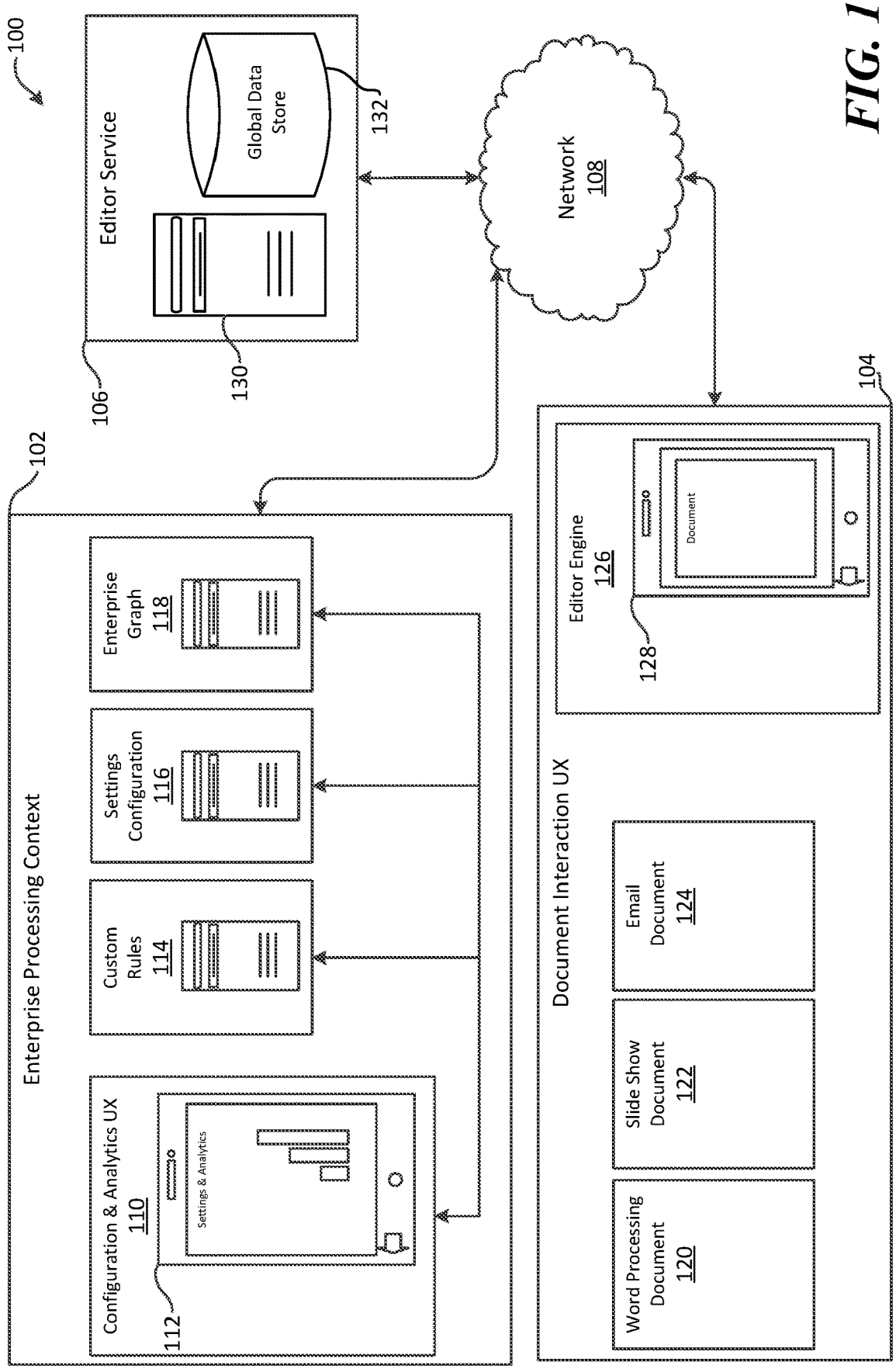
FIG. 1 illustrates an exemplary schematic diagram of an environment in which enterprise settings and rules may be configured, writing assistance may be performed and writing analytics may be measured and reviewed.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems and methods for enabling a user, enterprise, or both to create guidelines or rules by which a word processing application analyzes a document and to generate actions in response to the analysis based on those guidelines or rules. An enterprise may wish to control or provide guidelines regarding the way in which employees draft documents in an effort to ensure that some or all enterprise-created documents conform to enterprise policy.

Additional aspects of the disclosure relate to configuring and implementing document analytics. Document analytics may be configured by, for example, an enterprise administrator or a single user (e.g., the author of a document) of the systems and methods described herein. One or more properties of an enterprise-created document (e.g., trackable consumption-based metadata in a document, text, embedded objects, figures, etc.) may be analyzed, the context of the document may be determined, a determination may be made (based on the context of the document and the properties of the document) as to whether all or a portion of the document is related to one or more previously authored enterprise-documents, and authoring and editing suggestions related to the document may be provided based on consumption factors of the one or more previously authored related enterprise documents.

Implementations of document analytics may provide one or more mechanisms for tracking and displaying analytics for one or more documents to an enterprise administrator or a single user. According to examples, determined analytics may provide an indication as to what extent one or more entire document, or a portion thereof, have been consumed by readers as well as providing an indication as to how successful those documents or portions thereof have been in accomplishing their intended purpose. Analytics may be generated by tracking, for example, the identity of individuals that have received and opened a document, the number of individuals that have received and opened a document, the amount of time that an individual has spent with a document open, the amount of time that an individual has spent with a portion of a document open, the level of readership (e.g., deep read or skim), whether an individual that received a document responded to all or a portion of the document, the manner in which an individual that received a document responded to all or a portion of a document, and whether an individual that received a document provided feedback (e.g., liked, disliked, added comments, etc.) related to all or a portion of the document, among other examples.

Analytics may be customized by an administrator of an enterprise or a single author such that only analytical information of interest is analyzed, determined and provided. Examples of analytical information that may be analyzed, determined and provided includes: information related to geo-political content analytics (e.g., providing analysis relating to preferred geographic and political names and terms); trademark, branding and intellectual property analytics (e.g., providing analysis relating to trademark violations, branding inconsistencies and errors and unique intellectual property that an administrator or author may determine should be flagged proactively such as code names, proprietary information, etc.); extensibility analytics (e.g., providing analysis relating to defining terms at an organizational level that should be flagged based on organizational rules and preferences); high value content analytics (e.g., providing analysis relating to the integration of business-critical content such as job descriptions and requests for proposals against business outcomes); and organizational content analytics (e.g., providing analysis relating to aggregate patterns in content for an enterprise, organization or single user), among others.

Mechanisms are provided by the systems and methods described herein for customization of analytics such that an enterprise administrator or single author can choose a manner in which analytical information of interest is displayed. Various templates may be provided for grouping analytical information of interest. Additionally or alternatively, one or more item relating to analytical information of interest may be displayed by various means (e.g., chart, graph, number, color, figure, etc.) and an enterprise administrator or single user may select a desired display means for the one or more item relating to analytical information of interest for consumption analytics.

According to examples, analytical mechanisms may be implemented by the systems and methods described herein to provide recommendations to a user for authoring and editing documents. For example, if analytics from one or more relevant or related documents to a document currently being created indicate that all or a portion of the document being created are similar to all or a portion of one or more of the relevant or related documents, recommendations may be provided to a document author based on those analytics.

Exemplary recommendations that may be provided to a document author based on document analytics and analysis include: a recommendation to include one or more properties of a relevant or related document that was widely consumed, a recommendation to include one or more properties of a relevant or related document that received positive feedback from receivers of the relevant or related document, a recommendation to alter text or other properties of a document based on the consumption and feedback of relevant or related documents, a recommendation to remove one or more properties of a document based on one or more properties of a relevant or related document that was not widely consumed, and a recommendation to remove one or more properties of a document based on a relevant or related document that received negative feedback from receivers of the relevant or related document, among others.

According to additional examples, the systems and methods described herein may utilize machine learning and natural language processing models to analyze documents from a single user, branches and hierarchies within an enterprise, an entire enterprise, multiple enterprises, or a combination thereof, and generate analytics based on that analysis. For example, machine learning and natural language processing may be implemented to determine whether one or more properties of documents at the single user level, branch and hierarchy enterprise level, entire enterprise level or multiple enterprise level correspond to the level of consumption for a document, the success or lack of success of the intended purpose for a document, and feedback from readers for a document.

Documents, as referred to herein may be any document generated by an employee or agent of an enterprise, such as, for example, financial documents, marketing documents, enterprise strategy documents, enterprise planning documents, performance documents, agreements and contracts, sales documents, employee working documents, proposals, notes, research papers, lab results, client communications, internal communications, memoranda, etc. It can be onerous, unmanageable, or even impossible to manually review every document created within an enterprise. Accordingly, using the novel aspects provided herein, an enterprise may create customized rules by which a document is automatically analyzed. Such rules may relate to, for example, language consistency, clarity and conciseness of words and sentences, vocabulary choice, inclusive language, formal language, readability, privacy (e.g., rules requiring or suggesting removal of client or minor names, removal of organizational names, removal of social security numbers, removal of other identifying personal information, etc.), and branding. These rules may be based on, for example, the enterprise, the user, a target audience, or the document. Although a list of rules is provided, this disclosure is not intended to be limited to those identified rules; rather, this disclosure also includes any rule created by the enterprise or a user.

References are made herein to using a word processing application to analyze documents against such rules, however other applications may also be used to analyze documents against the customized rules such as, for example, an email application, a presentation application (e.g., a slide show presentation application), a spreadsheet application, a note taking application, SMS messaging applications, and conglomerate communication applications, etc.

Aspects of the present disclosure further contemplate application of enterprise rules to documents as part of a service. In other words, aspects further include providing one or more documents to a service that can separately apply the rules to each document or parts of a document. Aspects herein may be described with reference to an enterprise, however it is understood that such aspects may also be applied to an individual user (e.g., a document author or reviewer), a subset of users, as well as various other entities.

Aspects may further be described with reference to rules, however and it is understood that rules may include guidelines, procedures, recommendations, etc. Such rules may relate to format, content, headers, footers and properties in the document. Properties of the document may relate to, among other properties, the location in which a document is saved, the context of a document, a type of document, embedded objects in a document, text in a document, figures in a document, etc.

FIG. 1 illustrates an exemplary schematic diagram of an environment 100 in which enterprise settings and rules may be configured, writing assistance may be performed and writing analytics may be measured and reviewed. As illustrated, the environment 100 includes enterprise processing context 102, document interaction user experience 104, editor service 106 and network 108.

Enterprise processing context 102 includes configuration and analytics user experience 110 with exemplary computing device 112 displaying exemplary settings and analytics. According to examples, enterprise processing context 102 provides a mechanism by which a user (e.g., an enterprise, an enterprise administrator, an organization administrator, a professor, a single author, etc.) may view document editing rules, customize document editing rules, set new document editing rules, and view analytical information relating to utilization of document editing recommendations that have been sent to entities associated with the methods, systems and devices described herein.

Enterprise processing context 102 includes one or more computing devices (e.g., server computing devices 114, 116 and 118) for setting, viewing and customizing document rules, settings and recommendations relating to document creation and editing as well as analytical information relating to shared enterprise documents. According to examples, a computing device such as computing device 112 may be utilized by an administrator in an enterprise to interact with document rule settings and analytics. For example, an administrator, via computing device 112, may view pre-set rules and document rule templates such as: spelling rules, grammar rules, enterprise-based preference rules (e.g., rules involving the exclusion of client names in documents, only including preferred names for certain entities, making changes related to preferred geo-political designations, etc.). An administrator, via computing device 112, may designate whether rules and prompts related to those rules must be necessarily followed by users (e.g., a document cannot be saved unless a change is made) or are conditional (e.g., a user can choose to ignore a suggestion or recommended change).

According to additional examples an administrator may create custom rules in enterprise processing context 102 via configuration and analytics user experience 110. An administrator may determine that one or more preset rules or rule templates are useful for an enterprise's mission and also that various changes or additions to those rules may be beneficial to the enterprise. The administrator, via enterprise processing context 102, is able to customize the preset rules and rule templates which can be provided to a user via a document interaction user experience 104 to further aid in enhancing enterprise-based document creation and editing.

According to an example, an administrator may determine that preset rules and rule templates relating to misspelled words, which identify and flag client names as misspelled words, should be turned on as rules that are mandatorily or suggestively implemented amongst an enterprise, but that it would also be useful to provide suggestions to enterprise users regarding approved suggestions for replacing those flagged client names. An administrator, via enterprise processing context 102, may provide replacement suggestions to an enterprise group for replacing those flagged names via a custom rules engine.

According to additional examples a settings configurations engine may be implemented, via enterprise processing context 102 and a computing device such as computing device 112, by an administrator to set configurations such as whether a rule is mandatory or conditional, the way in which analytical information will be displayed, the type of information that will be displayed as analytics, etc.

An enterprise graph may be provided via a computing device such as computing device 112 that displays information related to an enterprise's documents and their consumption, utility and success. Information from such analytics may include data related to how often documents, or portions thereof, are being provided to enterprise authors, how often rules provided by the systems and methods proved herein are being viewed by enterprise authors, how often suggestions are being accepted by enterprise authors, how often suggestions are being denied or ignored by enterprise authors, whether, how and how often enterprise document content is being viewed by enterprise document consumers (e.g., entities that a document pitch is being aimed at), how and how often an enterprise document is being commented on and reused amongst enterprise authors and enterprise document consumers, and whether set rules and settings are leading to positive enterprise results, among others.

Document interaction user experience 104 includes various document types with which the systems and methods described herein may be implemented, such as word processing document 120, slide show document 122 and email document 124. Other document types and document applications may also implement the various systems and methods described herein.

In exemplary document interaction user experience 104, document authors invoking enterprise document editing rules may be provided with one or more suggestions relating to one or more preset rules and rule templates, or customized rules relating the document that one or more authors are working on. The one or more suggestions may be provided to a user based on a determination by the systems and methods described herein, that text, objects or associated properties of one or more previously authored documents are similar to a document currently being authored by a user. For example, an author working on a marketing presentation may be provided with a suggestion to include a slide from a determined similar slide deck in the enterprise that was determined to be the most viewed slide in a group of successful marketing slides from an enterprise. In another example, an author may be provided with a suggestion to eliminate a slide from a slide deck that has been determined to be a slide that has been included in presentations that are unsuccessful for presentations to similar consumer-client types. Authors may be provided with other relevant information via document interaction user experience 104 such as spelling recommendations, grammar recommendations, preferred client name substitution recommendations, consistency recommendations, clarity and conciseness recommendations, vocabulary choice recommendations, inclusive langue recommendations, formal language recommendations, readability recommendations, fluency recommendations, privacy recommendations and branding recommendations, among others.

Exemplary environment 100 includes editor service 106 which comprises one or more computing devices such as server 130 and global data store 132. Editor service 106 includes natural language processing models, machine learning models, and software engines that may be utilized by editor engine 126 via document interaction user experience 104. Document interaction user experience 104 generally includes a client application that may be utilized to implement rules and related data processing instructions provided by enterprise processing context 102 as well as preset rules in an enterprise document processing application associated with various document applications such as word processing document 120, slide show document 122 and email document 124.

Editor service 106 includes global data store 132 which may comprise compiled data from a single author, an enterprise or enterprises and/or groups within an enterprise with related documents created thereby, as well as pre-built language processing models for detecting issues related to document authoring and editing. Editor service 106 may utilize natural language processing models and machine learning to analyze documents from various entities and users and determine that certain language, objects, properties and/or patterns associated with those documents are associated with the relative success rates of one or more of those documents.

Due to storage and processing costs it is advantageous to provide and collect limited information as it relates to document interaction user experience 104 applications (e.g., a client application that does not rely on receiving cloud-based data immediately). For example, a preset number and type of rules may be provided to a client application for increasing the success rate of a document type (e.g., a sales pitch). Those rules may be provided to an application client such as a word processing application, a slide show application and an email document application, among others.

According to examples, a client application may access preset rules based on preset natural language processing models that recognize various spelling, grammatical and contextual signals. Alternatively, editor service 106 may collect information from one or more additional sources (e.g., an enterprise or an entity in an enterprise such as a marketing or legal department, document data and analytics collected from a group of enterprises, etc.), and a determination may be made that certain text, objects and/or other document properties are common among documents that are successful or unsuccessful in accomplishing a documents intended purpose (generating views, generating feedback, generating sales, etc.). Such information may be processed by a computing device such as server 130 and additional rules and suggestions may be generated and provided via document interaction user experience 104 and editor engine 126. Specifically, editor service 106 may make a determination that rules and/or suggestions based on collected data should be sent to a specific author or enterprise and stored in a client application via editor engine 126 based on analysis of collected data.

Advantages of the editor service 106 relate to the storage and processing costs associated with providing large natural language processing mechanisms and processing instructions in a document processing application that may not be relevant to entities that would not benefit from certain rules and suggestions, the ability to selectively provide rules to enterprises and groups within enterprises that are determined to benefit from specific rules and suggestions and the ability to store data related to rules and suggestions in a cache for entities that may benefit from the ability to access those rules and suggestions without having to access an online service (e.g., via the Internet and/or the cloud) such as editor service 106. Further advantages of the editor service 106 relate large data processing of received, analyzed and inspected documents to generate analytics that would otherwise not be possible to perform (at the same speed or at all) with purely client-side data processing.

According to examples, document interaction via document interaction user experience 104 provides a mechanism for users and their related devices to communicate online with and receive updated rules and suggestions from editor service 106 (e.g., a user may need to be connected to the Internet or a network in order to obtain up to date rules and suggestions from editor service 106).

Additionally or alternatively, document interaction via document interaction user experience 104 may provide a mechanism for users and their related devices to communicate periodically with and receive updated rules and suggestions from editor service 106 (e.g., the client application communicates with editor service 106 when a rule or suggestion change takes place that affects the entity associated with the client application, the client application communicates with the editor service 106 at predetermined intervals to update the natural language processing models for the client if a relevant rule or suggestion update has been determined after a past update has been installed via editor engine 126, etc.).

As illustrated, the environment 100 includes an enterprise processing context 102, servers 114, 116 and 118 hosting the enterprise processing context 102 and one or more computing devices 112. In this environment 100, enterprise processing context 102, editor service 106 and document interaction user experience 104, and the computing devices shown therein, are connected via a data communication network 108, such as the Internet, Intranet or other peer-to-peer communication networks. Additionally contemplated is the use of a service (not shown) to apply the disclosed rules. The service may be connected to the data communication network 108.

Computing devices 112 and 128 may be any computing device, such as, for example, a laptop, a desktop computer, a tablet PC, a mobile phone, or a tablet. The computing devices 112 and 128 may have stored thereon a word processing application, a slide show application or an email application, or Internet-based instructions on how to perform a document authoring or editing application. One or more users may be associated with each computing device shown in environment 100.

Aspects provided herein are directed to providing a rules platform. The rules platform enables an enterprise to create rules by which a document processing application analyzes a document. The rules platform further enables an enterprise to generate actions or suggestions in response to an analysis of a document based on those guidelines or rules. Accordingly, an enterprise may customize the way in which a document processing application analyzes a document.

Customized rules applied to a document may relate to, for example, language consistency, clarity and conciseness, vocabulary choice, inclusive language, formal language, readability, privacy, and branding. Each will be described in further detail, below. It is understood that this list of rules is merely exemplary and is not intended to be limiting. It is further understood that one of ordinary skill in the art may contemplate the implementation of additional rules by which an application analyzes a document.

An enterprise may use a rules platform encompassed by enterprise processing context 102 to create a customized rule relating to language consistency. It is understood that an administrator or other individual of the enterprise may create and set these rules to be applied to documents. It is further understood that other people within the enterprise's departments, subsidiaries, or sub-groups may also create and set these rules to be applied to documents.

Language consistency rules are directed to the uniform usage of words or phrases in a document. Language consistency rules may also relate to characteristics of a document compared to others. Such characteristics may include sentence length, vocabulary level or richness (e.g., word variety), document length, etc.

Language consistency rules may require a word processing application to analyze an entire document for language consistency as well as provide alternative recommendations and explanations associated with those recommendations. The analysis may constitute the generation of a table including each word or phrase used in the document and a counter corresponding to the total number of instances that particular word or phrase is used in the document. The analysis may additionally or alternatively comprise machine learning analysis based on one or more inspected documents and their properties. Based on this analysis, the document processing application may identify the same words or phrases that are not identically written and therefore inconsistent. For example, the document processing application may analyze a document to identify that it contains 17 instances of the word "nonprofit" and 12 instances of the word "non-profit." Based on the generated language consistency rules, the document processing application may indicate, via a user interface, this discrepancy and may also provide suggestions to eliminate the inconsistent usage. For example, the document processing application may suggest converting each instance of "non-profit" to "nonprofit" or vice versa. The word processing application may also provide alternative suggestions to change each instance of "non-profit" and "nonprofit" to "non profit." Accordingly, an enterprise may use a rules platform via enterprise processing context 102 to create language consistency rules as well as provide resolutions to language consistency issues in a document that does not comply with those rules. For instance, the rules platform may leverage the auto correct functionality to automatically correct issues in the future. Additionally or alternatively, a document processing application according to the systems and methods described herein may provide suggestions when no inconsistency within a single document is detected but where all instances of a word, phrase, punctuation, etc. is inconsistent with enterprise voice or standards (e.g., an enterprise may require standards such as those provided by the Chicago Manual of Style or other style type manuals or guidelines). For example, all instances of the word "nonprofit" may be identical within a document, but the word processing application may provide a suggestion to change all instances to "non-profit" based on the overwhelming use of "non-profit" in other documents within an enterprise or as required by one or more style manuals or guidelines.

An enterprise may use a rules platform to create a customized rule relating to the clarity and conciseness of a document. Clarity and conciseness rules may require the document processing application to analyze a document to identify issues relating to, for example, the word length of each sentence; the line length of each sentence; the proximity of modifiers to a verb or object; grammar; the occurrences of elaborate words, vague words, specific words, passive voice; provide explanations of words, phrases, or concepts; the use of negatives and affirmatives; or the use of transitions. Clarity and conciseness rules may further require a document processing application to provide alternative recommendations and explanations regarding why the particular word or phrase may not conform to the generated clarity and conciseness rules. For example, a document processing application may display an explanation for why certain words, sentences, paragraphs, or pages do not conform to the clarity and conciseness rules. The document processing application may also provide suggestions to eliminate those issues.

As an example, an analysis of a document based on a clarity and conciseness rules may flag an unduly long paragraph. The document processing application may explain that the particular paragraph was flagged for not conforming to preset or customized clarity and conciseness rules, it may provide a suggestion to shorten the length of the sentence, and it may provide an explanation for why long sentences are generally complicated and challenging to read. Accordingly, an enterprise may use a rules platform as encompassed by enterprise processing context 102 to create clarity and conciseness rules as well as provide resolutions to clarity and conciseness issues in a document that does not comply with those rules.

An enterprise may use a rules platform encompassed by enterprise processing context 102 to create customized rules relating to vocabulary choice in a document. Vocabulary choice rules may require the document processing application to analyze a document to identify issues relating to word usage as well as provide alternative recommendations and explanations associated with those recommendations. For example, the document processing application may analyze a word in the context of a sentence, paragraph, or even the relevant topic/subject matter to provide alternative word recommendations. The document processing application may also review subject/verb agreement, tense, voice, etc. to determine alternative word recommendations. The document processing application may also add explanations relating to why the recommended word would be a more suitable alternative to the presently used word in the document. Accordingly, an enterprise implement a rules platform associated with enterprise processing context 102 to create vocabulary rules as well as provide resolutions to vocabulary issues in a document that does not comply with those rules.

An enterprise may use a rules platform encompassed by enterprise processing context 102 to create a customized rule relating to inclusive language in a document. Inclusive language rules may require the document processing application to analyze the document to identify language that is considered to exclude particular groups of people as well as provide word choice recommendations that are more inclusive and associated explanations. For example, the document processing application may identify the use of the word "Latino" as referring to a group of people and provide an alternative suggestion to use the word "Hispanic" because it is considered a more inclusive term. In another example, the document processing application may identify the use of the word "man" and recommend a more gender-neutral word to include women. Accordingly, an enterprise may use the enterprise processing context 102 to create inclusive language rules as well as provide resolutions to inclusive language issues in a document that does not comply with those rules.

An enterprise may use a rules platform encompassed by enterprise processing context 102 to create a customized rule relating to formal language. Additionally or alternatively, there may be external requirements imposed on an enterprise for how documents, or portions thereof, should be constructed, worded and/or formatted. Formal language rules may require the document processing application to analyze the document to identify the use of informal language and provide formal language recommendations and associated explanations. Such formal language rules may be based on the context of the document, the document type (e.g., technical paper vs. internal organizational email), the document drafter, or the recipient of the document. For example, an enterprise may require more formal language to be used in certain types of documents, such as bid proposals, marketing communications, or investor documents. In another example, an enterprise may require a document to contain more formal language if the document is written by a person in a supervisory role or an executive. In yet another example, an enterprise may require more formal language in documents that are sent to customers. Accordingly, an enterprise may use a rules platform encompassed by enterprise processing context 102 to create formal language rules as well as provide resolutions to formal language issues in a document that does not comply with those rules.

An enterprise may use a rules platform encompassed by enterprise processing context 102 to create a customized rule relating to readability. Readability rules may require the document processing application to analyze the document to identify whether a document in its entirety or a portion thereof is easily readable as well as provide alternative recommendations and explanations associated with those recommendations. Readability of a document can depend on the context of the document or the target audience to which the document is directed. Readability rules may analyze, for example, the complexity of document syntax, the structure of the document, the format of the document, or typography to determine the ease with which a reader understands the document. Accordingly, an enterprise may use a rules platform encompassed by enterprise processing context 102 to create readability rules as well as provide resolutions to readability issues in a document that does not comply with those rules.

An enterprise may use a rules platform encompassed by enterprise processing context 102 to create a customized rule relating to privacy. Privacy rules may require the word processing application to analyze the document to identify the use of people's names, company names, organization names, etc. as well as provide alternative recommendations and explanations associated with those recommendations. An enterprise may have certain guidelines regarding the use of client names in documents. Accordingly, the word processing application may identify, in the document, specific client names and provide alternative recommendations to the use of those names such as the word "client" or "Jane Doe." Accordingly, an enterprise may use the rules platform 102 to create privacy rules as well as provide resolutions to privacy issues in a document that does not comply with those rules.

An enterprise may use a rules platform encompassed by enterprise processing context 102 to create a customized rule relating to branding. An enterprise may require that each reference, in a document, to the organization itself, products, services, subsidiaries, departments, initiatives, etc. to be referenced in a certain way. Accordingly, branding rules may require the word processing application to analyze the document to identify any branding inconsistencies and provide alternative recommendations and explanations associated with those recommendations. Accordingly, an enterprise may use enterprise processing context 102 to create branding rules as well as provide resolutions to branding issues in a document that does not comply with those rules.

According to additional examples an enterprise may use a rules platform encompassed by enterprise processing context 102 to enforce rules based on various style guidelines such as those provided by the Chicago Manual of Style, the Modern Language Association, or simplified technical language standards.

Accordingly, a rules platform encompassed by enterprise processing context 102 may be used by an enterprise to create various rules that align with enterprise policy. Aspects of the present disclosure further provide for rules to be created by individual users that may be applied to documents created by that user or to documents created by one or more related users. These rules may be generated using a tool such as a step-by-step wizard that easily allows an enterprise or individual to create rules and identify each of the properties of that rule. For example, the wizard may allow an enterprise or a user to identify the name of the rule, identify how the document processing application should analyze documents against the rule, what types of recommendations, definitions, and explanations, the document processing application should provide, when the document processing application should apply the rule, etc. In other embodiments, other tools are used to create these rules. Rules may be configured manually by the enterprise, a third party, a user, or modified by a machine learning process.

The rules described herein may be selectively applied based on the context of the document, the drafter, the recipient of the document, or a group in which the drafter or recipient belongs. For example, the enterprise may wish to apply certain rules to documents that are seen by people who are external to the organization and apply different rules to documents that are seen by people who are internal to the organization. The enterprise may further wish to apply certain rules based on the type of the document. For example, the enterprise may apply certain rules to any documents containing financial, confidential, or strategic information. Accordingly, the word processing application may be capable of ascertaining document properties, drafter properties, and recipient properties that are used to identify one or more particular rules to apply. In some embodiments, the word processing application may further include user interface components or user options to allow a user or enterprise to selectively apply or not apply the rules.

It is further understood that such rules may be selectively turned on and off by a person related to the enterprise or a user. In other embodiments, only a person with authorized credentials may turn on and off such rules. Furthermore, a person with authorized credentials may lock such rules as "on" or "off" and optionally set the level of required action to be taken when a rule is triggered. This level of control may be applied on a per rule basis and certain rules may be controllable by a user while other rules are simultaneously only controllable by an individual with authorized credentials (e.g., an administrator). Additional aspects may include the ability to selectively run some rules on part of a document and run other rules on other parts of the document.

Figure 2:
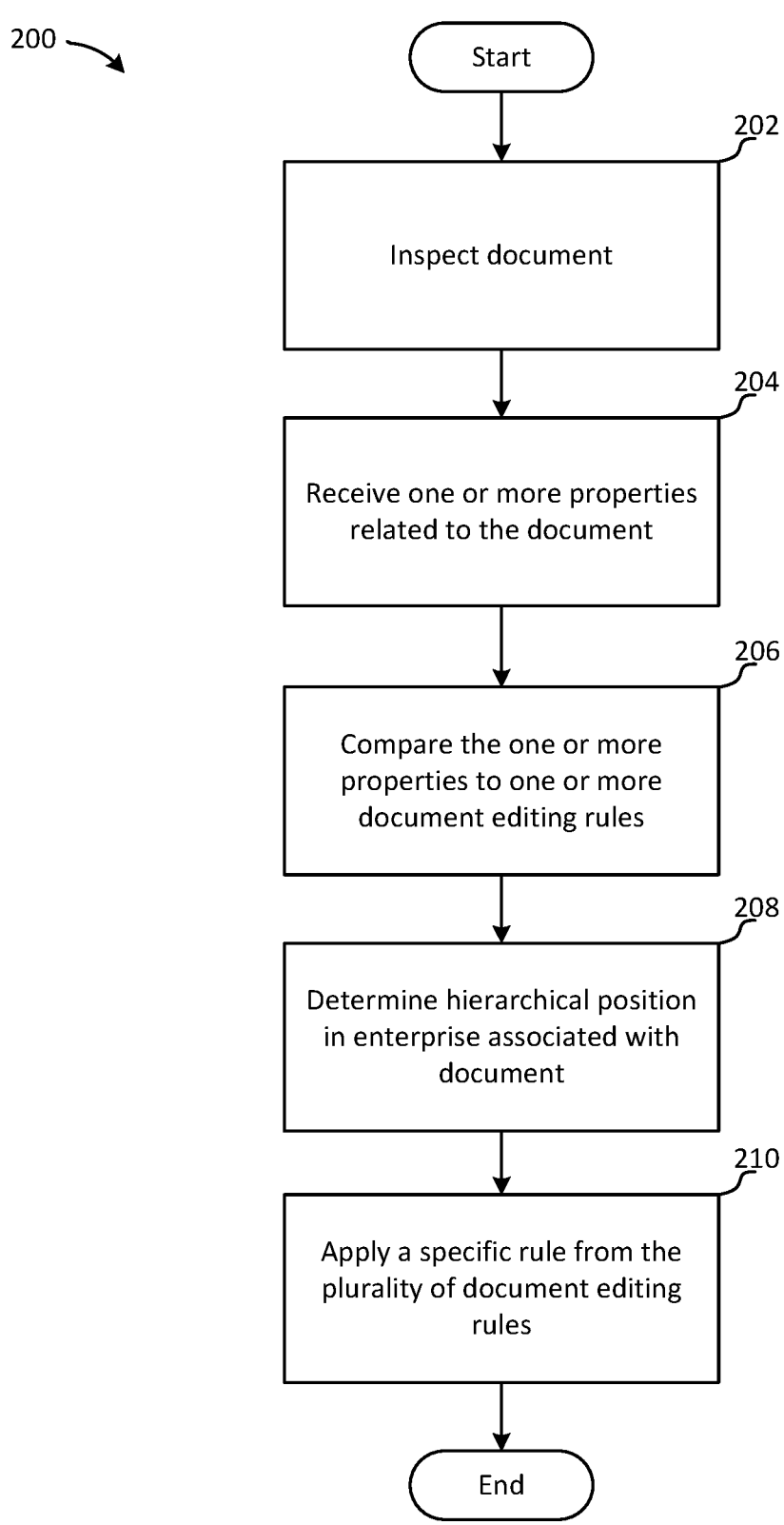
FIG. 2 illustrates an example method of applying one or more customized rules to a document based on various properties such as hierarchical position and document purpose, among others.

FIG. 2 illustrates an example method 200 for applying one or more customized rules to a document based on a hierarchical position in an enterprise associated with the document. The method 200 begins at a start operation and continues to operation 202 where a document is inspected by, for example, a document application such as a word processing document application, a slide show document application or an email document application. From operation 202 flow continues to operation 204 where one or more properties related to the document are received. Examples of the properties that may be received include trackable consumption-based metadata in a document, text, embedded objects, figures, a location in which a document is saved, the context of a document, and document type, among others. According to examples, the one or more properties may be received after performing natural language processing of the document using one or more natural language processing models.

From operation 204 flow continues to operation 206 here the one or more received properties are compared to one or more document editing rules. For example, after performing natural language processing on the text of a document a determination may be made as to whether all or a portion of a document or the document's properties relate may be impacted by one or more enterprise rules such as, for example, language consistency rules, clarity and conciseness of words and sentences rules, vocabulary choice rules, inclusive language rules, formal language rules, readability rules, privacy rules and branding rules. According to examples, the enterprise document editing rules and the comparison of the document's properties to the document editing rules may be performed entirely by rules stored on a single computing device on which document authoring and editing is being performed. According to other examples, the document editing rules and the comparison of the document's properties to the document editing rules may be performed on multiple devices via, for example, a network and one or more server devices. For example, a document authoring and editing application may be preloaded with certain rules which are deemed likely to be used often by the enterprise or a group within an enterprise, and certain additional rules may only be accessed while a device containing the document authoring and editing application is connected to the Internet or the Intranet. According to yet other examples, the document editing rules and the comparison of the document's properties to the document editing rules may be performed entirely online. That is, a device may access, through a network, a document authoring and editing application that is a web-based application storing instructions for authoring and editing the document, as well as document editing rules, and the authoring, editing, and rule application may be performed entirely online.

From operation 206 flow moves to operation 208 where a determination is made as to a hierarchical position in an enterprise associated with the document. For example, an enterprise hierarchy may be composed of various tiers such as marketing, sales, legal, and other branches within an enterprise and one or more property as it relates to the document may indicate whether one or more tier within the enterprise is associated with the document. Additionally or alternatively, tiers within an enterprise hierarchy may relate to user, administrator, author, or document editor position within the enterprise as whole or within a branch (e.g., marketing, sales, legal, etc.) of the enterprise. Although a hierarchical position in an enterprise illustratively according to method 200, other associated author and document properties may also be also be used to determine whether a specific rule should be applied. For example, the document type (e.g., an internal enterprise communication vs. an external pitch), the specific author, a group in an enterprise that an author is a part of (e.g., managers, administrators), among others.

From operation 208 flow continues to operation 210 where a specific rule from the one or more document editing rules is applied. For example, one or more rules may apply to one or more tiers, branches and positions of an enterprise. Similarly, one or more rules may additionally or alternatively apply within and across a hierarchy. Further, certain document editing rules may only apply to a sales team, other rules may only apply to a legal team, certain rules may be mandatory for a group of users in an enterprise and other rules may be merely suggestive for a group of users in an enterprise. From the performed natural language processing on the text of the document, as well as extraction of one or more properties related to the document, one or more rules applicable to the hierarchical position in the enterprise associated with the document may be identified as being applicable to the document and the document's intended purpose, and the one or more identified rule may be applied by, for example, providing a recommendation to change text or one or more property of the document based on the identified one or more applicable rules. From operation 210 flow moves to an end operation and the method 200 ends.

Figure 3:
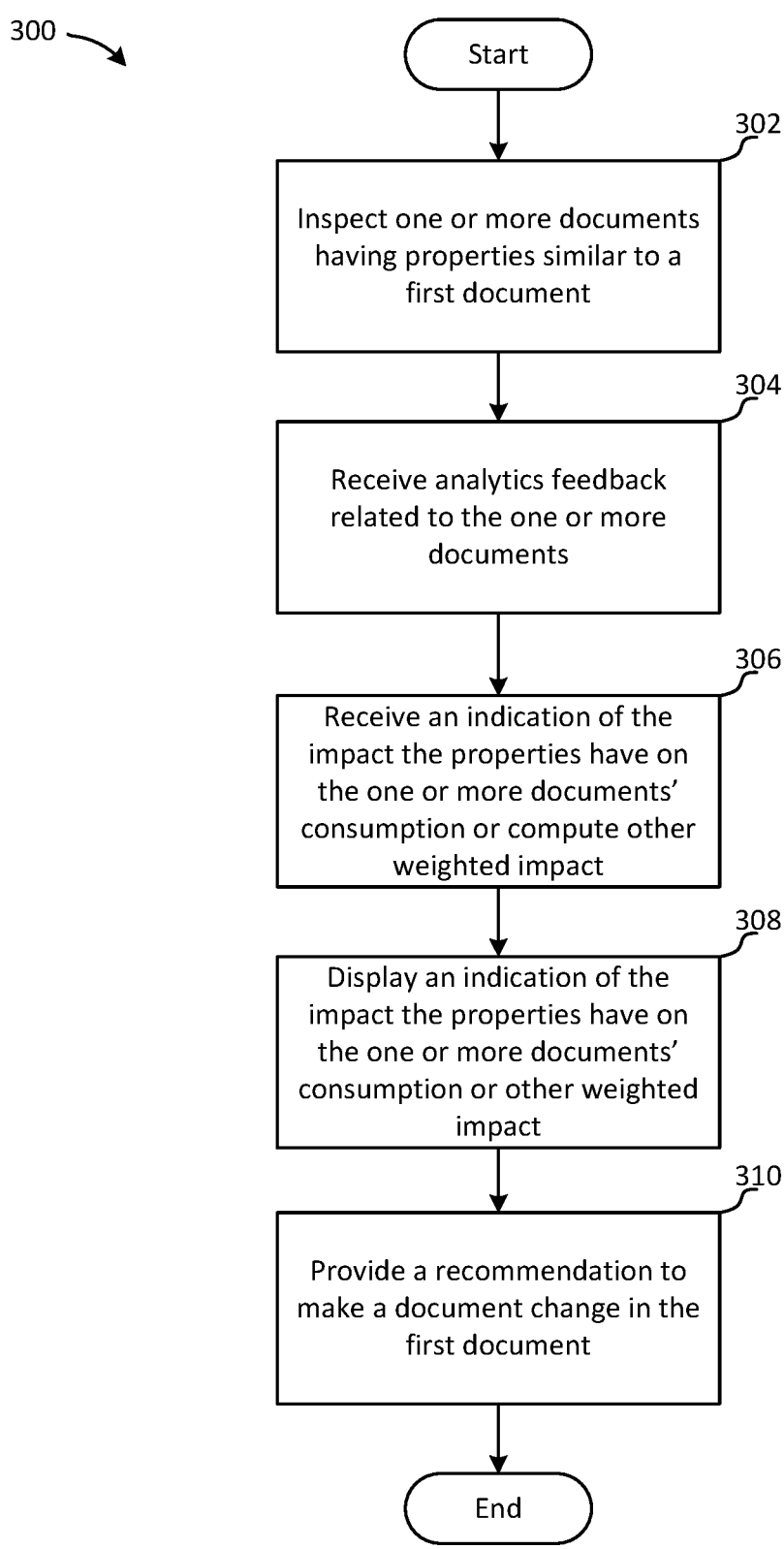
FIG. 3 illustrates an example method of compiling document analytics related to document consumption and providing recommendations for editing a related current document.

FIG. 3 illustrates an example method 300 for compiling document analytics related to document consumption and providing recommendations for editing a related current document. Flow begins at a start operation and continues to operation 302 where one or more documents having properties similar to a first document are inspected. For example, a determination may be made that a first document (e.g., a document currently being authored or edited) in an enterprise is similar to previously one or more previously created documents by an enterprise, multiple enterprises, etc. The one or more previously created documents may be determined to be similar to the first document because of properties such as trackable consumption-based metadata in a document, text, embedded objects, figures, a location where a document is saved, the context of a document, and a type of document, among others.

From operation 302 flow continues to operation 306 where an indication of the impact the properties have on the one or more documents' consumption or other weighted impact is computed. For example, an analysis may be performed based on processing of the one or more documents that certain portions of a document are read in detail, merely skimmed, receive positive internal or external feedback, and/or result in presentations that are successful in their intended purpose (e.g., high readership levels, high comment levels, successful sales, etc.). Further, with regard to weighted impact, the one or more documents may include text, objects or other properties associated with them that make inclusion of such text, objects or other associated properties mandatory amongst an enterprise, tiers within an enterprise, for certain individuals within an enterprise, for certain types of presentations or document creation types, etc.

From operation 306 flow moves to operation 308 where an indication of the impact the properties have on the one or more documents' consumption or other weighted impact is displayed. The indication may be displayed via an administrator computing device and an administrative analytics application. The administrative analytics application may be a stand-alone application run on the computing device or the administrative analytics application may be a web-based application that the computing device must connect to via a network in order to access. The administrative analytics application may display the indication of the impact the properties have on the one or more documents' consumption in a preset set way (e.g., one or more templates) or the display may be customized such that only selected metrics are displayed and such that metrics are displayed in a specific manner specified by an enterprise analytics administrator (e.g., graphs, percentages, views, etc.).

From operation 308 flow continues to operation 310 where a recommendation to make a document change in the first document is provided to a document author or editor of the first document. For example, based on one or more rules applicable to the first document or the user and analytics garnered from the one or more documents a recommendation may be made to change all or a portion of the first document. According to examples, the recommendation may relate to rules such as language consistency rules, clarity and conciseness of words and sentences rules, vocabulary choice rules, inclusive language rules, formal language rules, readability rules, privacy rules and branding rules, among others. According to additional examples, the recommendation may also relate to document consumption analytics such as whether one or more enterprise documents, or portions thereof, determined to be similar to the first document have been read in detail, were merely skimmed, received positive internal or external feedback and/or result in presentations that are successful in their intended purpose (e.g., high readership levels, high comment levels, successful sales, etc.). The recommendation may be provided to an author or editor via a display in an document authoring and editing application. Such a recommendation may be determined to be mandatory for the user such that the user must make the recommended change to the document before saving the document or sending it to another individual, or the recommendation may be determined to be merely suggestive, such that a user may choose to ignore the recommendation. From operation 310 flow continues to an end operation and the method 300 ends.

Figure 4:
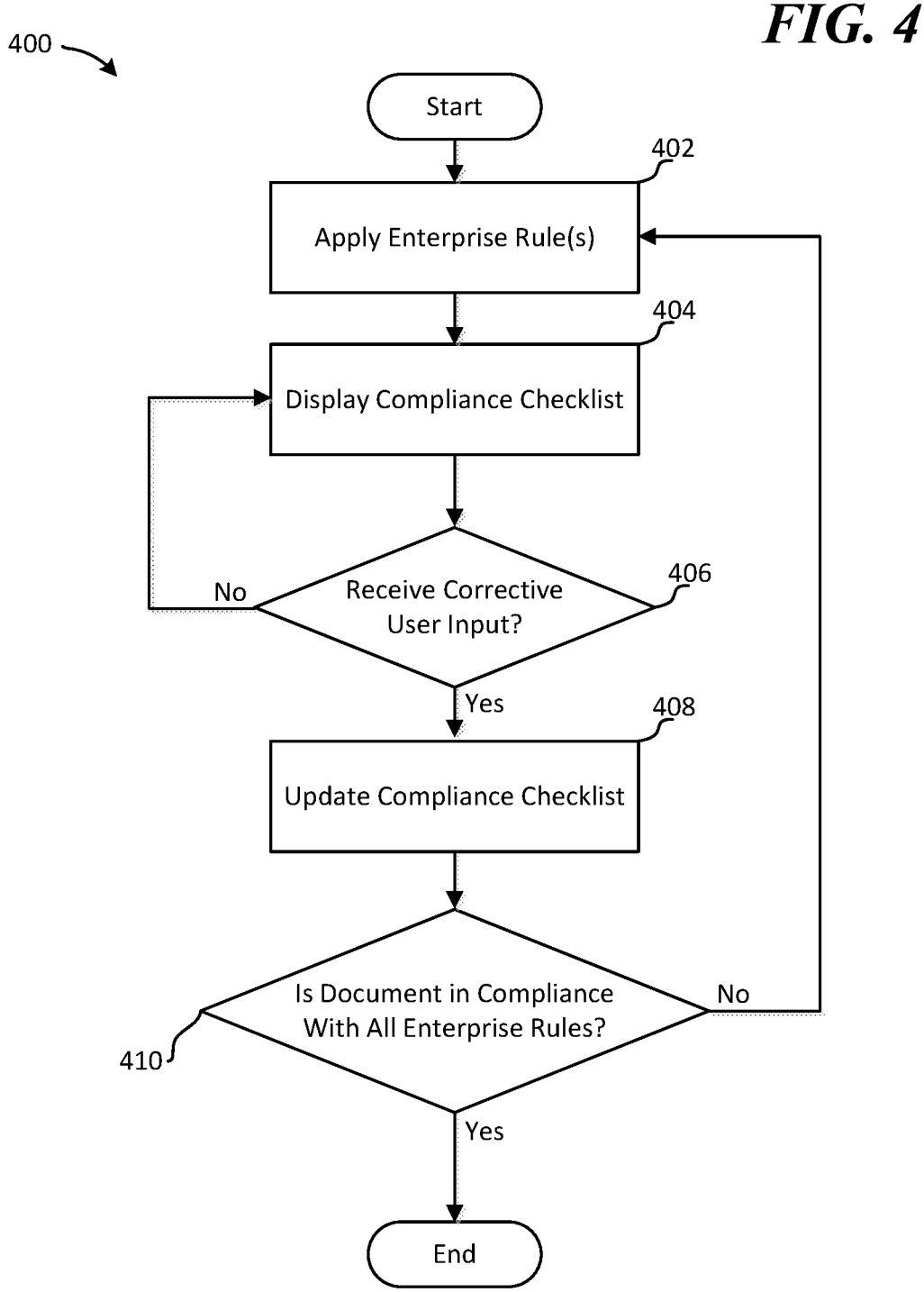
FIG. 4 illustrates an example method of applying one or more customized rules to a document of a word processing application.

FIG. 4 illustrates an example method 400 of applying one or more customized rules to a document of a word processing application. After the start operation, the method 400 flows to application of the enterprise rules operation 402 in which the word processing application analyzes the documents against the customized rules. As described herein, the customized rules may relate to, for example, language consistency, clarity and conciseness, vocabulary choice, inclusive language, formal language, readability, privacy, and branding.

Figure 5:
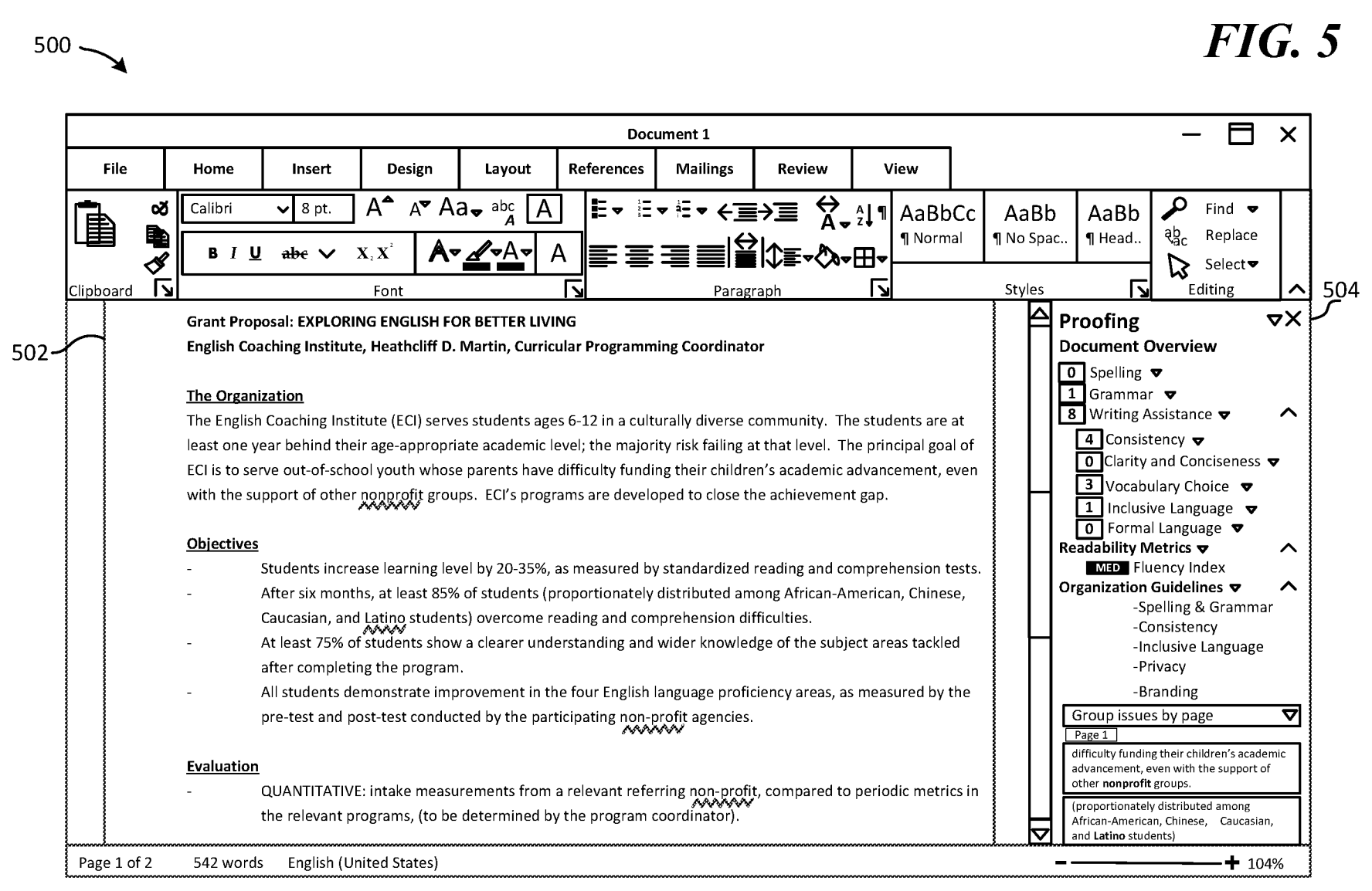
Figure 6:
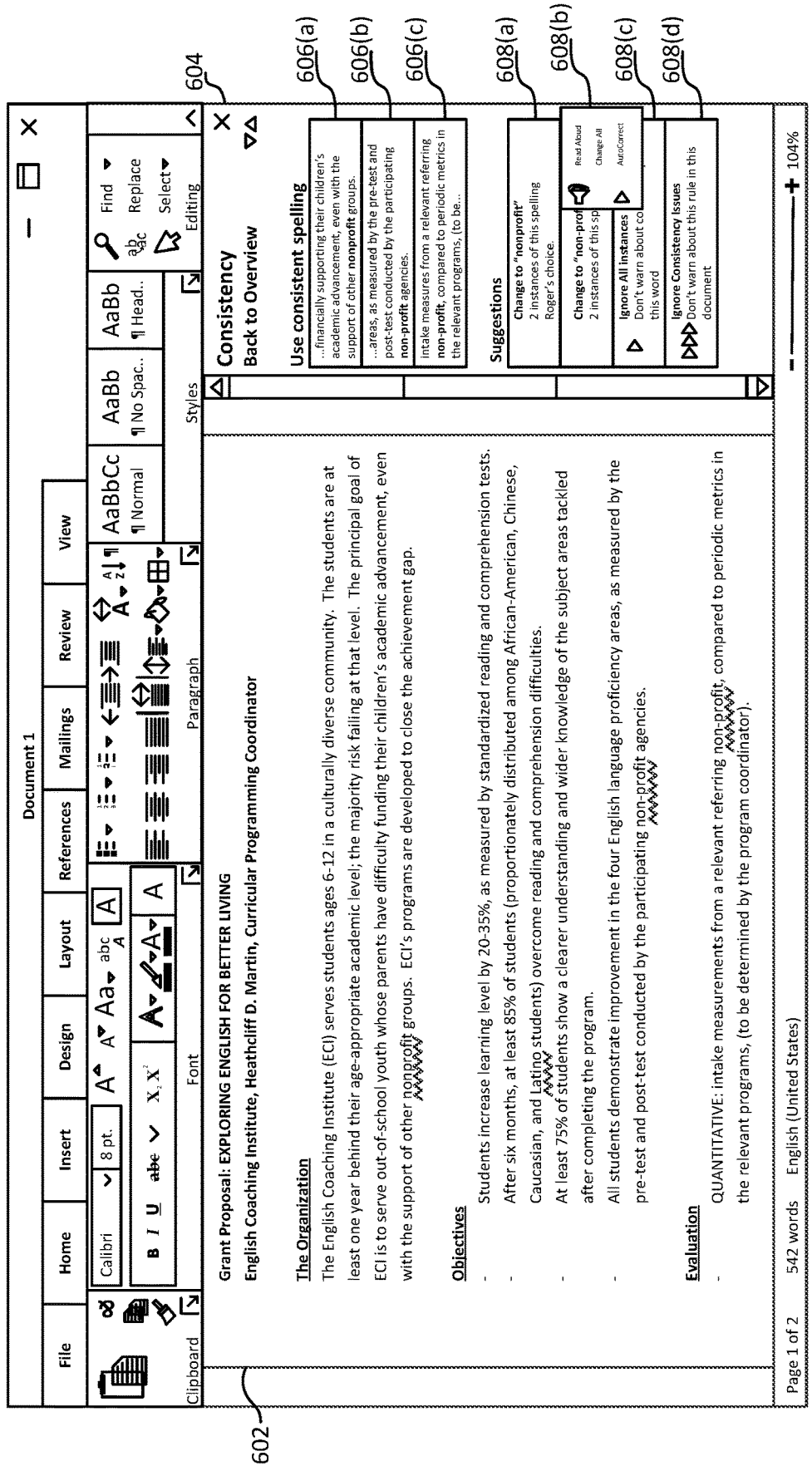
FIG. 6 illustrates an example word processing document that was analyzed against customizable guidelines.

In the display compliance checklist operation 404, the word processing application displays the results of the analysis obtained from the application of enterprise rules operation 402. The results may be displayed as a compliance checklist as part of a proofing pane as illustrated in FIGS. 5 and 6. The word processing application may display the results of the analysis obtained from the application of enterprise rules operation 402 by other means such as highlighting, flagging, haptically, or otherwise indicating the results of the analysis. In particular, the compliance checklist may depict (e.g., via visual, auditory, haptic or other indication) whether or not the document is in compliance with each of the created rules. For example, if one or more issues exist, the compliance checklist may display, in association with a particular rule, a dash mark, and therefore non-compliance with that rule. If, alternatively, no issues exist, the compliance checklist may display, in association with the particular rule, a check mark, and therefore compliance with that rule. In other embodiments, the compliance checklist may numerically indicate the number of issues flagged for each applied rule. Accordingly, if one or more issues exist, the compliance checklist may display, in association with a particular rule, a number greater than zero, and therefore non-compliance with the rule. If, alternatively, no issues exist with respect to the particular rule, the compliance checklist may display a zero in association with the rule and therefore compliance, with that rule.

In the receive corrective user input operation 406, the word processing application determines whether a corrective user input is received. A corrective user input may relate to, for example, a corrective update to a word or phrase that was flagged in response to the analysis of the document as performed in operation 402. In some embodiments, the word processing application may receive a manual user correction (e.g., manually receive a typed word or phrase) and in other embodiments the word processing application may receive a selection of a recommendation displayed in response to the analysis performed in operation 402. If, the received user input is not a corrective user input, flow proceeds to the display compliance checklist operation 404.

If the received user input is a corrective user input, flow proceeds to the update compliance checklist operation 408. Flow may also move to operation 408 if the received user input is an "ignore flagged issue" input (e.g., if a user determines that a flagged issue is benign or they wish to otherwise ignore an issue). In the update compliance checklist operation 408, the word processing application updates the compliance checklist as displayed in the exemplary proofing task pane as illustrated and described in FIGS. 5 and 6.

The word processing application then determines whether the document is in compliance with all rules in operation 410. If the document is not in compliance with all rules, flow proceeds to the apply enterprise rules operation 402. If, alternatively, the document is in compliance with all rules, the method 400 ends.

FIG. 5 illustrates an example word processing application 500 displaying a document 502 that was analyzed against one or more customizable rules. Illustrated is a proofing pane 504 that displays an overall summary of the spelling, grammar, and writing assistance (referred to herein generally as "document issues") issues related to the document 502. Document issues as referred to herein may include an overview of the document based on an application of the one or more customizable rules. As displayed in the exemplary proofing pane 504, the identified document issues relate to consistency, clarity and conciseness, vocabulary choice, inclusive language, and formal language. In this particular example, each issue corresponding to a word or phrase that is identified from the application of the rules is displayed in the document 502 as a wavy underline. Accordingly, in this particular example, the document 502 displays a first wavy underline corresponding to a consistency issue relating to the use of the words "nonprofit" and "non-profit" in the document. This example further illustrates a second wavy underline corresponding to an inclusive language issue relating to the use of the word "Latino" in the document. Accordingly, it is understood that customizable rules may be created by an enterprise or user that, when applied, can be indicated to an author or reader (via visual, haptic, auditory, or other indication means).

FIG. 6 illustrates an example word processing application 600 displaying a document 602 that was analyzed against one or more customizable rules. In this particular example, the proofing task pane 604 displays consistency issues in the document 602 relating to the words "nonprofit" and "non-profit" as identified based on an application of the consistency rules. The proofing task pane 604 displays the context 606(a), 606(b) and 606(c) associated with each instance of the words "nonprofit" and "non-profit" as well as suggestions 608(a), 608(b), 608(c) and 608(d). It is understood that although the context 606(a), 606(b) and 606(c) and suggestions 608(a), 608(b), 608(c) and 608(d) are displayed in a proofing task pane 604, they may alternatively or additionally be displayed via other display methods.

Figure 7:
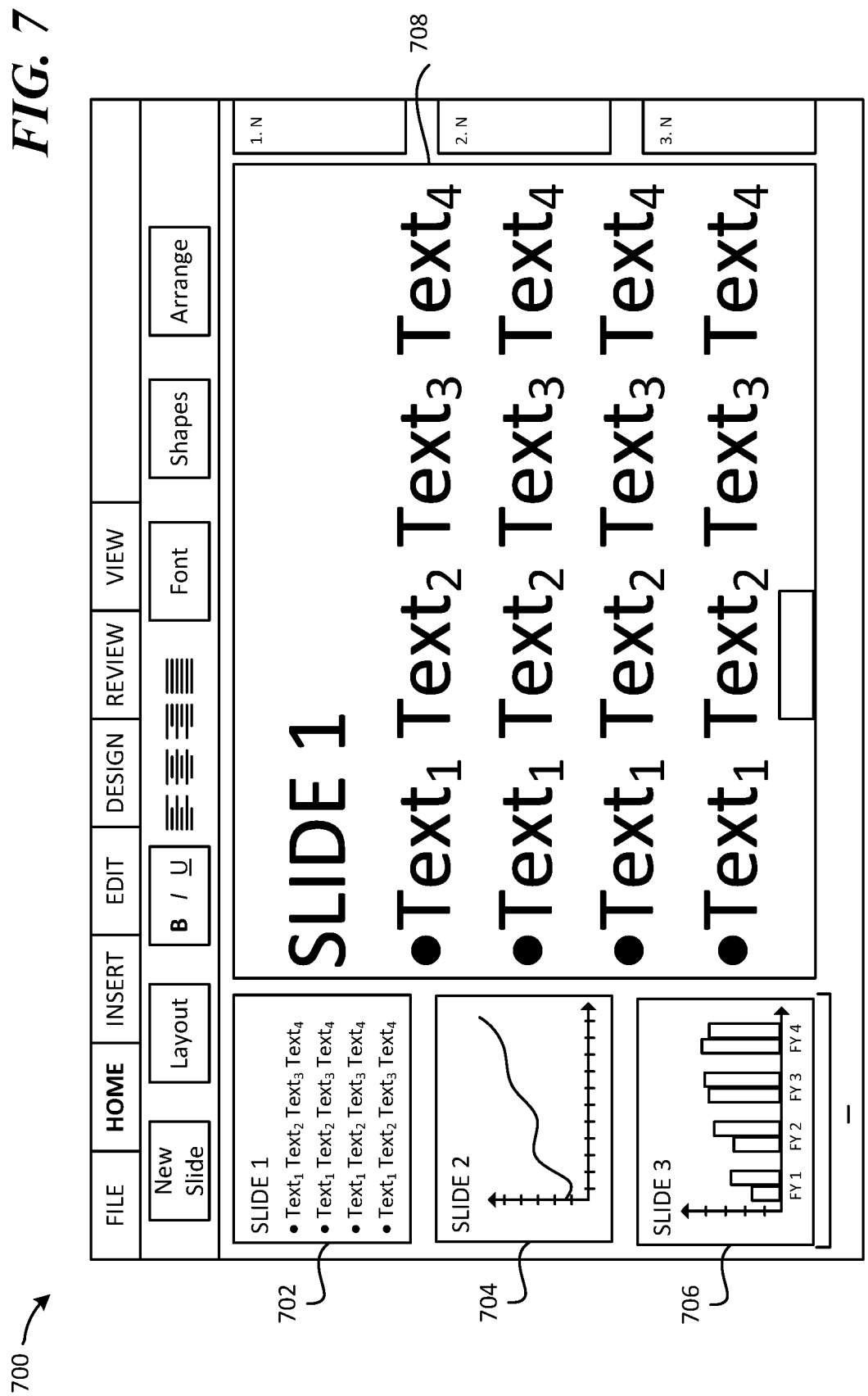
FIG. 7 illustrates an example slide show document as part of a slide show presentation that is being created and edited.

FIG. 7 illustrates an example slide show application 700 displaying a slide show document 708 as part of a slide show presentation that is being created and edited. Although a slide show document is depicted for illustrative purposes, the concepts shown and described with regard to the systems and methods described herein may be applied to other document and communication mechanisms such as spreadsheets, note taking applications and documents, SMS messages, email applications and documents, as well as applications that conglomerate portions of various communication means, among others. Slide show application 700 also includes a slide show presentation overview with slides 702, 704 and 706 displayed on the left side of the slide show application 700. According to examples, one or more properties from the slide show presentation may be extracted and analyzed. For example, properties related to trackable consumption-based metadata in a document, text, embedded objects and figures may be analyzed to determine whether all or a portion of the slide show presentation is related to one or more previously authored enterprise documents and document authoring and editing recommendations related to the slide show presentation based on consumption and other factors (e.g., factors such mandatory or suggestive document authoring, reviewing and sharing enterprise rules) of the one or more previously authored enterprise documents may be provided.

According to examples, text from slide one 702 may be run through one or more natural language processing models in order to determine whether it relates to one or more previously authored enterprise documents and whether the text may have an issue that should be resolved as it relates to one or more enterprise rules. Properties from slide two 704 and slide three 706 may likewise be processed and analyzed to determine whether embedded objects, figures and other information may relate to one or more previously authored enterprise documents and whether those properties may have an issue that should be resolved as it relates to one or more enterprise rules. Additional suggestions recommendations may be made via the slide show application 700 to include additional material in the slide show presentation from one or more related enterprise documents (e.g., include one or more elements from successful or highly viewed related enterprise documents), exclude material from the slide show presentation based on one or more related enterprise documents (e.g., exclude text, a figure, an object, etc. from the slide show presentation which was found in related enterprise documents that were not successful or that were not highly viewed), or modify material in the slide show presentation based on one or more related enterprise documents (e.g., one or more related successful or highly viewed enterprise documents contains similar text, similar figures, similar objects, etc.).

Figure 8:
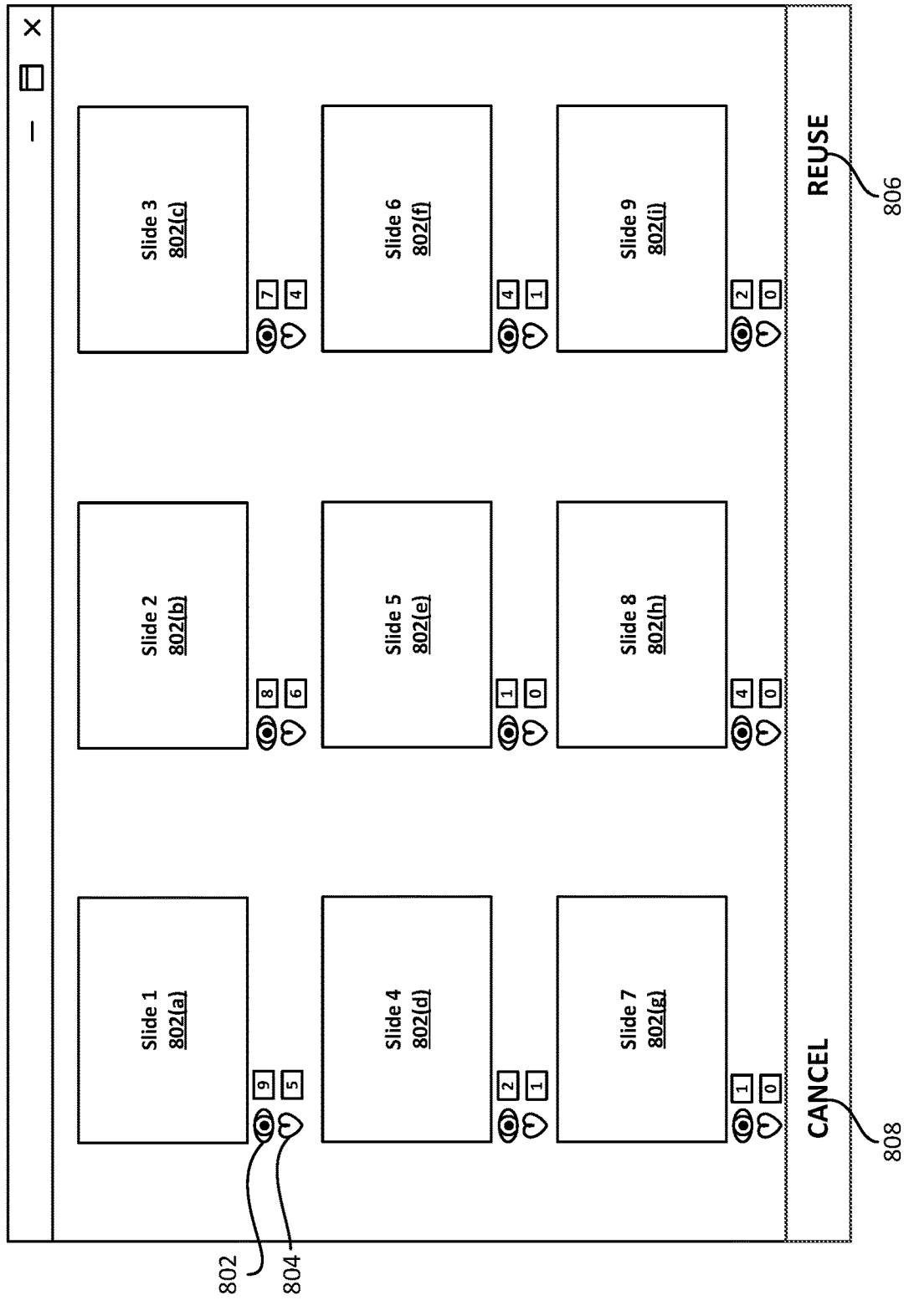
FIG. 8 illustrates an example related slide show that has been determined to be relevant to a slide show presentation that is in a creation or editing stage.

FIG. 8 illustrates an example related enterprise slide show 800 that has been determined to be relevant to a slide show presentation that is in a creation or editing stage such as the slide show depicted in FIG. 7. Related enterprise slide show 800 may be provided to an author of a similar slide show presentation after analysis by an analytics processing engine that has determined that related enterprise slide show 800 is similar to the slide show that is currently in a creation or editing stage and that one or more properties associated with enterprise slide show 800 may have contributed to its success (e.g., it was successful in accomplishing its intended purpose such as making a sale, getting enhanced viewership or readership, it was successful in generating positive comments, etc.).

Example related enterprise slide show 800 includes view metrics 802 for each slide and like metrics 804 for each slide. For example, each of slides 802(a)-802(i) include an eye icon demonstrating the number of users that have viewed an individual slide in related enterprise slide show 800 (e.g., slide one 802(a)) has been viewed by 9 users, and each of slides 802(a)-802(i) include a heart icon demonstrating the number of users that have liked an individual slide in related enterprise slide show 800 (e.g., slide one 802(a)) has been liked by 5 users. Example related enterprise slide show 800 may be presented to an author of a related slide via an application interface, such as via pop-up window or other similar mechanism, such that the author can view the related enterprise slide show 800, as well as the metrics therein, and select to reuse 806 one or more slides or portions thereof in related enterprise slide show 800. According to an additional example, an author may make a cancel selection 808 in order to ignore a recommendation to include one or slides, or portions thereof, of related enterprise slide show 800.

Figure 9:
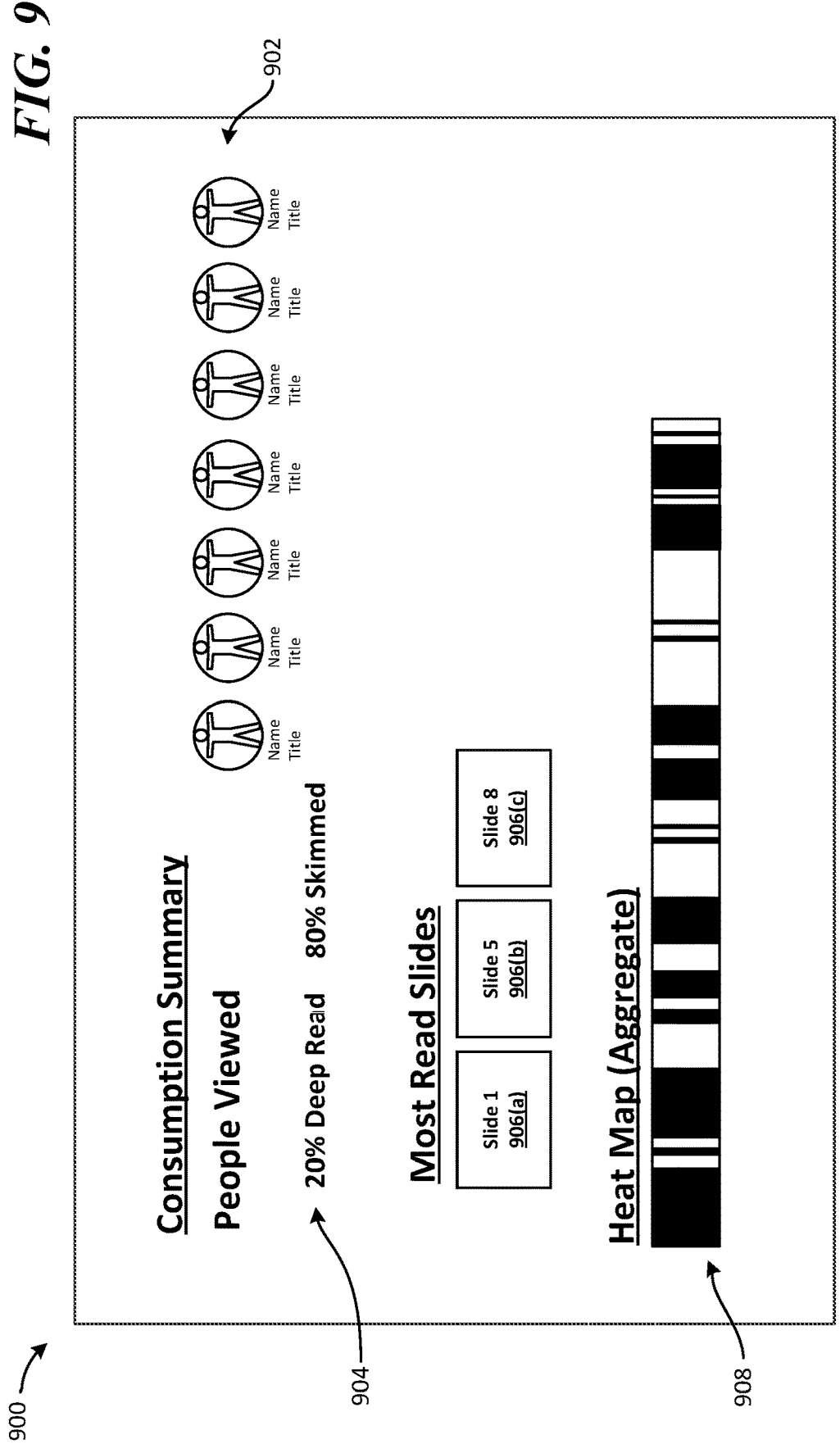
FIG. 9 illustrates an example graphical user interface displaying exemplary analytics for a slide show presentation.

FIG. 9 illustrates an example graphical user interface 900 displaying exemplary analytics for a slide show presentation. Such exemplary analytics may be provided to an author or editor of a document or to an enterprise administrator in, for example, an enterprise processing context such as enterprise processing context 102 in FIG. 1.

Example graphical user interface 900 includes a consumption summary showing the users that have viewed the presentation at 902. The consumption summary may include, for example, the name and title of the users that have viewed the presentation, as well as other information such as what sub-group or sub-groups each of the users belongs to within an enterprise. The consumption summary at 904 also provides the depth of readership of the presentation, showing that 20 percent of the users who viewed the presentation performed a deep read of the presentation and that 80 percent of the users who viewed the presentation performed a skimmed review of the presentation. Such metrics may be obtained, by for example, tracking the amount of time that a user spent on each slide, tracking comments made on the presentation, as well as other information related to time spent reviewing all or a portion of the presentation.

The consumption summary also provides a summary of the most read slides, here indicating that slide one 906(a), slide five 906(b) and slide eight 906(c) were the most read slides among the users that opened the presentation. Graphical user interface 900 also includes a heat map illustrating which portions of the presentation received the most readership, comments and/or likes by users that opened the presentation. Such metrics may be useful for a document author or enterprise administrator in determining what portions of enterprise presentations are most influential to a presentation's success as indicated by one or more document consumption properties and factors.

Figure 10:
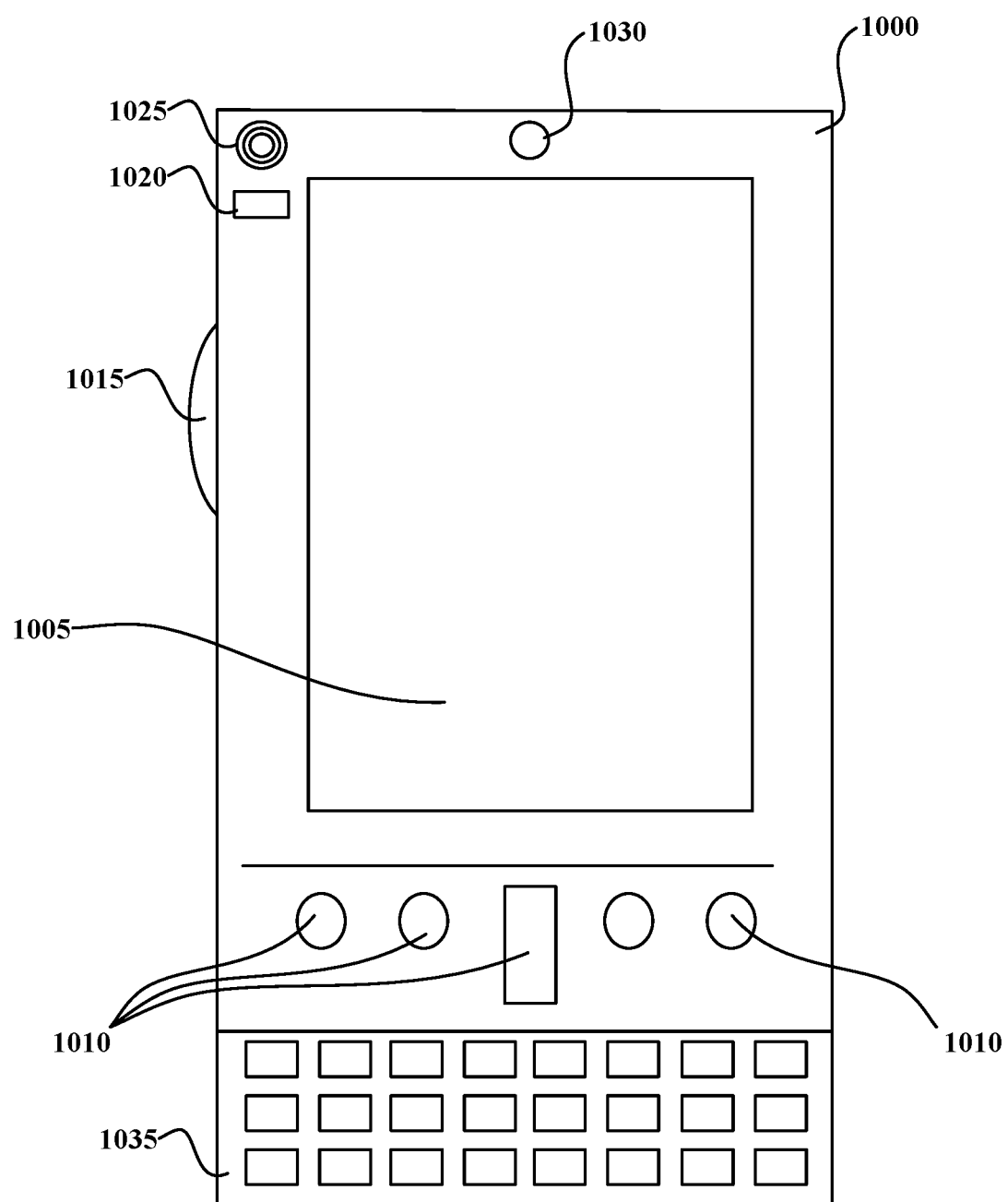
FIGS. 10 and 11 are simplified block diagrams of a mobile computing device with which aspects of the disclosure may be practiced.

FIGS. 10 and 1 illustrate a mobile computing device 1000, for example, a mobile telephone, a smart phone, wearable computer (such as a smart watch), a tablet computer, an e-reader, a laptop computer, and the like, with which embodiments of the disclosure may be practiced. In some aspects, the client may be a mobile computing device. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

Figure 11:
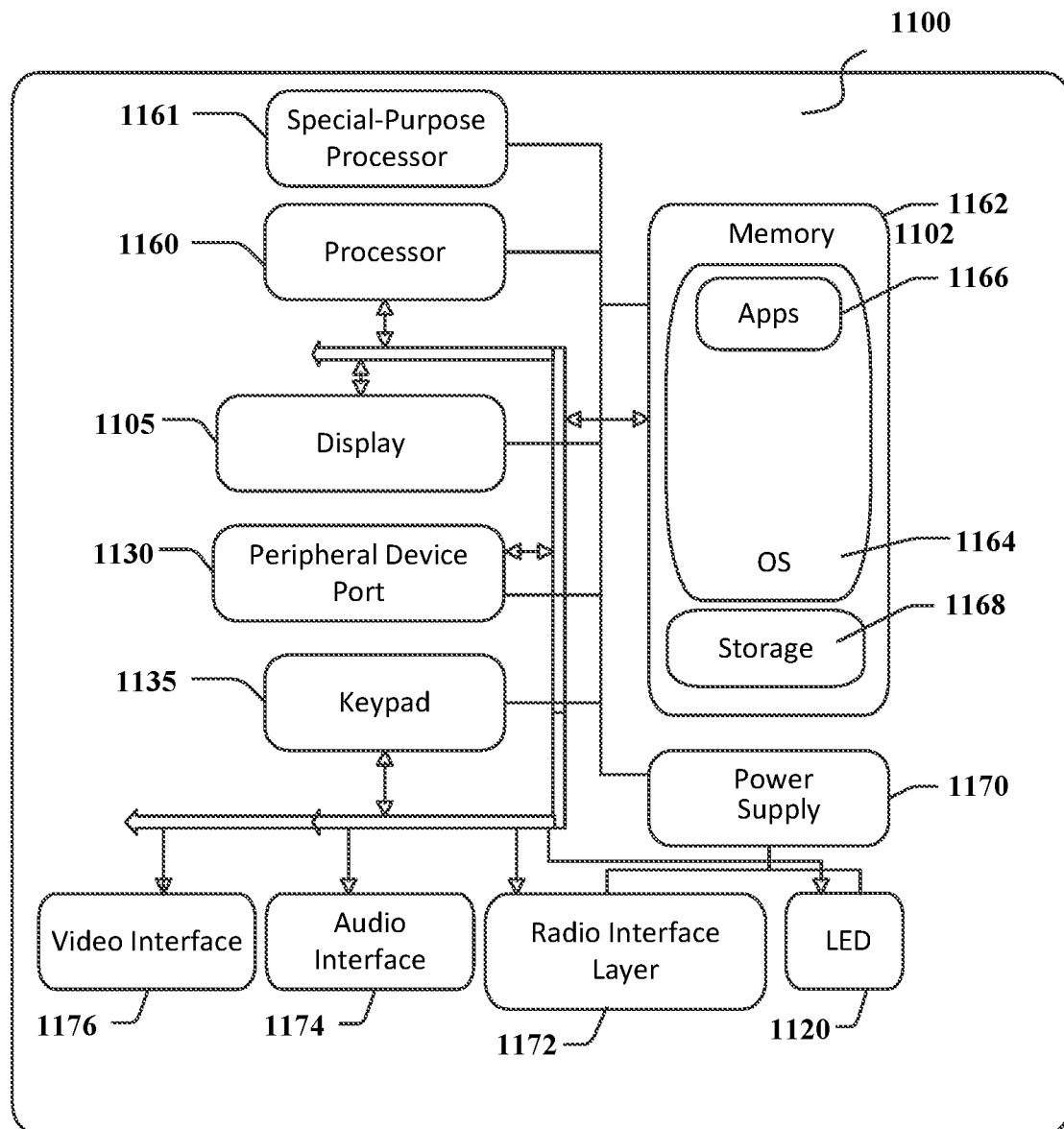

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing and operating a rules platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
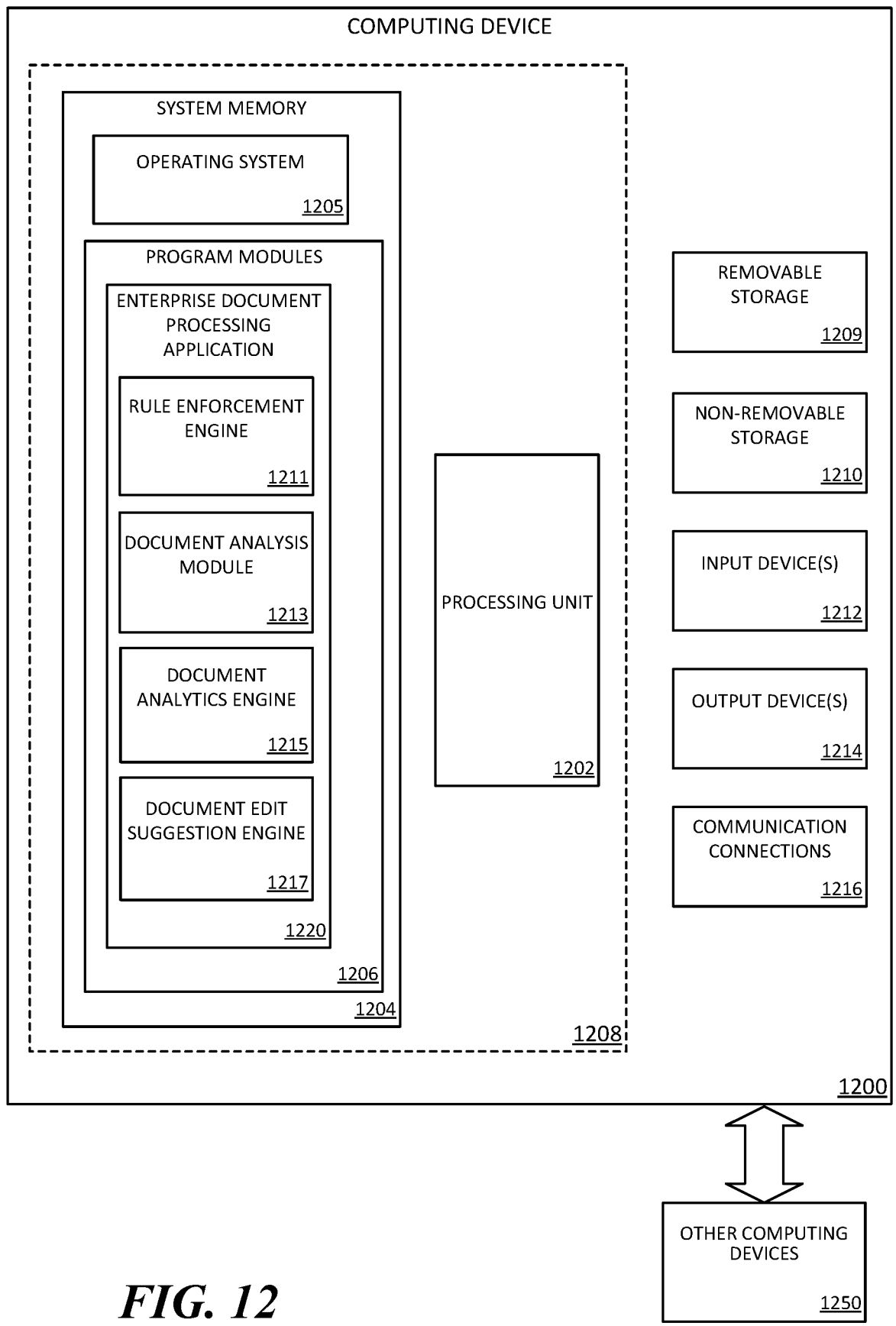
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for implementing a rules platform and analytics processing modules on a computing device (e.g., server computing devices 114, 116, 118 and 130), including computer executable instructions for a rules platform and analytics processing modules that can be executed to employ the methods disclosed herein. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more document application programs or one or more components in regards to FIG. 1. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., enterprise document processing application 1206) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
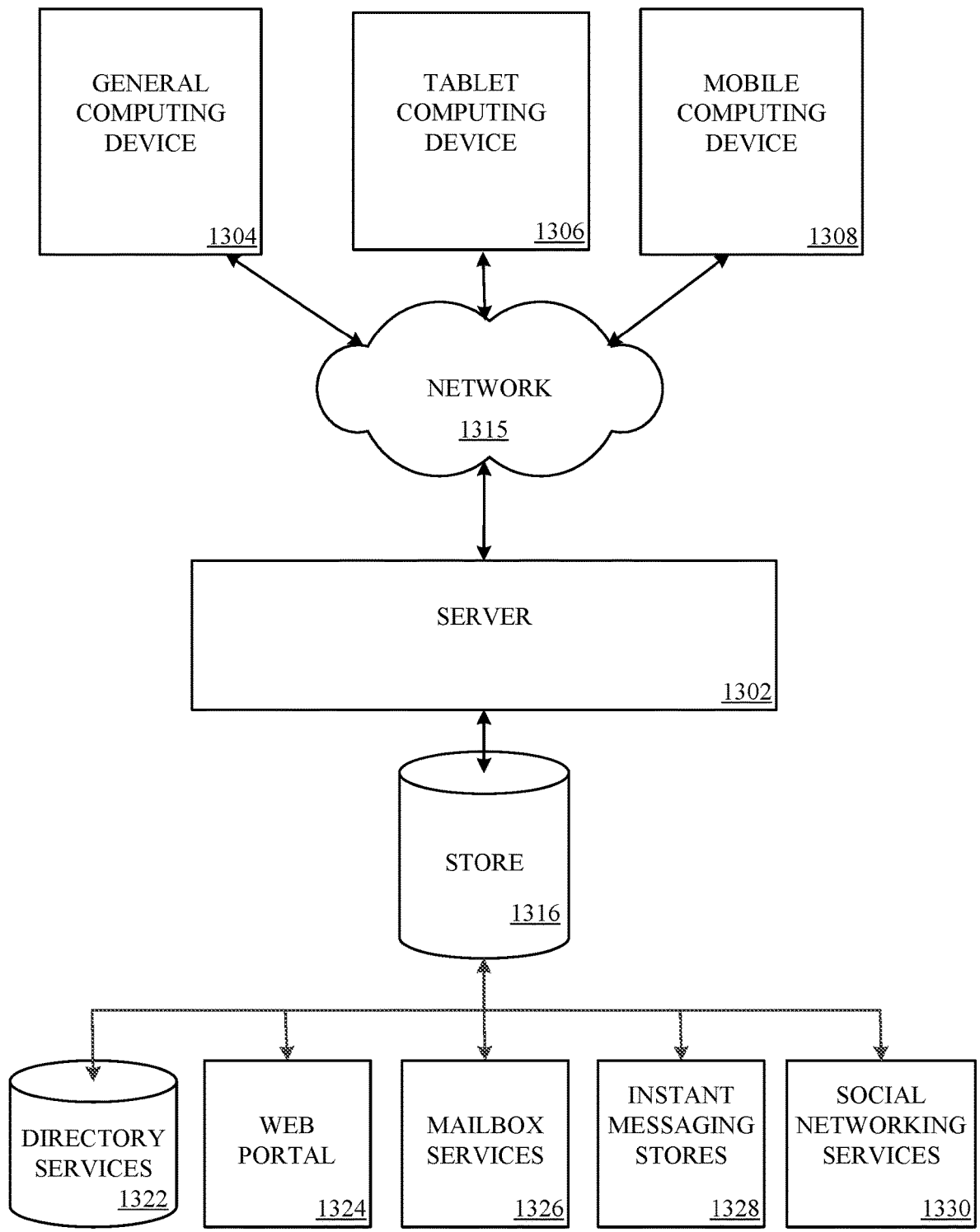
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The enterprise document processing application 1206 may be employed by a client that communicates with server device 1302, and/or the enterprise document processing application 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer system described above with respect to FIGS. 10-14 may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
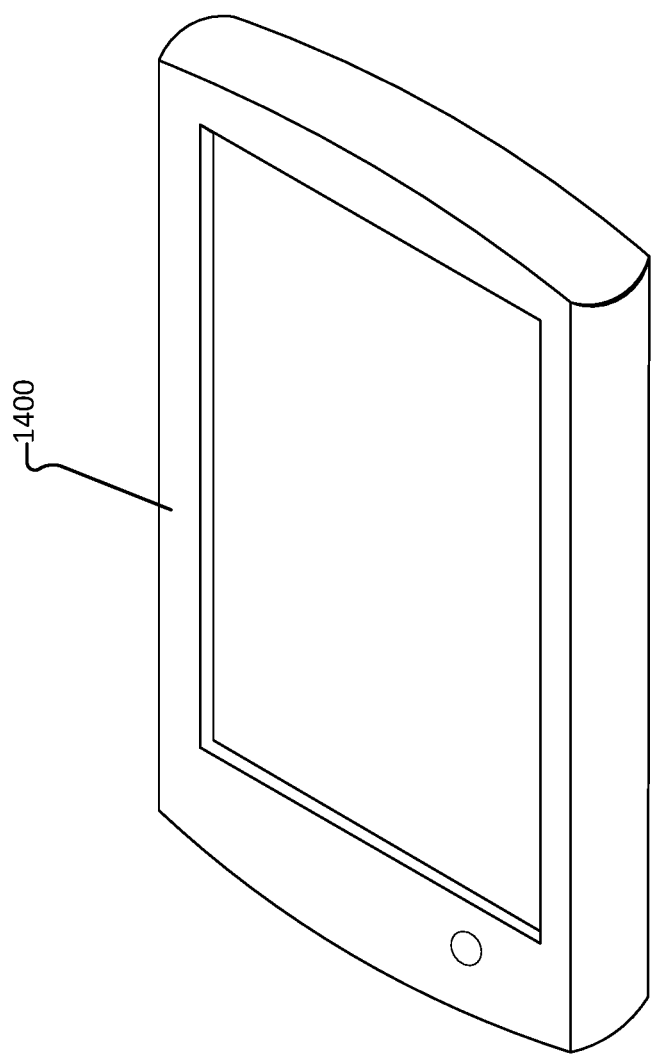
FIG. 14 illustrates a tablet computing device for executing one or more aspects of the present disclosure.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for selectively managing document editing for an enterprise, comprising:
   providing an enterprise-based policy for managing document content, the enterprise-based policy comprising a plurality of document editing rules contingent on a set of enterprise characteristics;
   analyzing a first document via a natural language processing model, wherein the document is being created by or was created by one or more of:
      a word processing application;
      a spreadsheet application;
      a slide show application;
      an email application;
      a note taking application; and
      a SMS messaging application;
   inspecting one or more properties related to the first document via the natural language processing model;
   comparing, based on the analysis by the natural language processing model, the one or more properties related to the first document to the plurality of document editing rules;
   determining, based on the comparison, that the first document fails to comply with a specific rule from the plurality of document editing rules;
   displaying an indication that the document is not in compliance with the specific rule from the plurality of document editing rules;
   determining that the specific rule from the plurality of document editing rules is mandatory, and that corrective user input is not received, and upon determining that the specific rule is mandatory:
      automatically applying, without user input, based on a set of enterprise characteristics associated with the first document and the one or more properties related to the first document, the specific rule to change the first document; and
      requiring a document change associated with the specific rule to be made prior to allowing any subsequent document action.

2. The method of claim 1, wherein each of the plurality of document editing rules is associated with an enforcement criteria, the enforcement criteria dictating a degree to which each of the plurality of document editing rules is applied mandatorily or suggestively.

3. The method of claim 1, further comprising:
   upon determining that the specific rule is mandatory, requiring a document change associated with the specific rule to be made prior to allowing the first document to be sent.

4. The method of claim 1, further comprising:
   associating trackable analytics metadata to at least one of the properties related to the first document;
   receiving feedback related to a success of the first document for its intended purpose; and
   receiving an indication of an impact that at least one of the properties related to the first document has on the success of the first document for its intended purpose.

5. The method of claim 4, further comprising:
   determining that one or more document properties of a second document are the same as at least one of the properties related to the first document;
   determining the impact that at least one of the properties related to the first document has on the first document's success for its intended purpose; and
   providing a recommendation to make a document change in the second document based on the determined impact that at least one of the properties related to the first document has on the first document's success for its intended purpose.

6. The method of claim 4, further comprising:
   determining that one or more document properties related to one or more documents are the same as at least one of the properties related to the first document;
   determining the impact that the one or more document properties related to the one or more documents has on a success of the one or more documents for their intended purpose; and
   providing a recommendation to make a document change in the first document based on the determined impact that the one or more document properties related to the one or more documents has on the success of the one or more documents for their intended purpose.

7. The method of claim 1, further comprising:
inspecting a plurality of documents having one or more properties that are the same as the one or more properties related to the first document;
receiving feedback related to a success of the plurality of documents for their intended purpose;
receiving an indication of an impact that at least one of the properties has on the success of the plurality of documents for their intended purpose; and
providing an indication of the impact that at least one of the properties has on the success of the plurality of documents for their intended purpose.

8. A computer-readable storage device comprising executable instructions that, when executed by a processor, assist with selectively managing document editing for an enterprise, the computer-readable storage device including instructions executable by the processor for:
providing an enterprise-based policy for managing document content, the enterprise-based policy comprising one or more document editing rules contingent on a set of enterprise characteristics;
analyzing a first document via a natural language processing model, wherein the document is being created or was created by one or more of:
a word processing application;
a spreadsheet application;
a slide show application;
an email application;
a note taking application; and
a SMS messaging application;
inspecting one or more properties related to the first document via the natural language processing model;
comparing, based on the analysis by the natural language processing model, the one or more properties related to the first document to the one or more document editing rules;
determining, based on the comparison, that the first document fails to comply with a specific rule from the one or more document editing rules;
displaying an indication that the document is not in compliance with the specific rule from the one or more document editing rules;
determining that the specific rule from the one or more document editing rules is mandatory, and that corrective user input is not received, and, when the specific rule is mandatory:
automatically applying, without user input, based on a set of enterprise characteristics associated with the first document and the one or more properties related to the first document, the specific rule to change the first document; and
requiring a document change associated with the specific rule to be made prior to allowing any subsequent document action.

9. The computer-readable storage device of claim 8, wherein each of the one or more editing rules is associated with an enforcement criteria, the enforcement criteria dictating a degree to which each of the one or more document editing rules is applied mandatorily or suggestively.

10. The computer-readable storage device of claim 8, wherein the instructions are further executable by the processor for:
upon determining that the specific rule is mandatory, requiring a document change associated with the specific rule to be made prior to allowing the first document to be sent.

11. The computer-readable storage device of claim 8, wherein the instructions are further executable by the processor for:
upon determining that the specific rule is mandatory, requiring a document change associated with the specific rule to be made prior to allowing the document to be saved.

12. The computer-readable storage device of claim 8, wherein the instructions are further executable by the processor for:
associating trackable analytics metadata to at least one of the properties related to the first document;
receiving feedback related to a conformance of the first document to enterprise standards; and
receiving an indication of an impact that at least one of the properties related to the first document has on the conformance of the first document to enterprise standards.

13. The computer-readable storage device of claim 12, wherein the instructions are further executable by the processor for:
determining that one or more document properties of a second document are the same as at least one of the properties related to the first document;
determining the impact that at least one of the properties related to the first document has on the conformance of the first document to enterprise standards; and
providing a recommendation to make a document change in the second document based on the determined impact that at least one of the properties related to the first document has on the conformance of the first document to enterprise standards.

14. The computer-readable storage device of claim 12, wherein the instructions are further executable by the processor for:
determining that one or more document properties related to a plurality of documents are the same as at least one of the properties related to the first document;
determining the impact that the one or more document properties related to the plurality of documents has on a conformance of the plurality of documents to enterprise standards; and
providing a recommendation to make a document change in the first document based on the determined impact that the one or more document properties related to the plurality of documents has on the conformance of the first document to enterprise standards.

15. The computer-readable storage device of claim 8, wherein the instructions are further executable by the processor for:
inspecting a plurality of documents having one or more properties that are the same as the one or more properties related to the first document;
receiving feedback related to a conformance of the plurality of documents to enterprise standards;
receiving an indication of an impact that at least one of the properties has on the conformance of the plurality of documents to enterprise standards; and
indicating the impact that at least one of the properties has on the conformance of the plurality of documents to enterprise standards.

16. A system for assisting with selectively managing document editing for an enterprise, comprising:

a memory for storing executable program code; and a processor, functionally coupled to the memory, the processor being responsive to computer-executable instructions contained in the program code and operative to:

provide an enterprise-based policy for managing document content, the enterprise-based policy comprising a plurality of document editing rules contingent on a set of enterprise characteristics;

analyze a first document via a natural language processing model, wherein the document is being created by or was created by one or more of:

a word processing application;

a spreadsheet application;

a slide show application;

an email application;

a note taking application; and a SMS messaging application;

inspect one or more properties related to the first document via the natural language processing model;

compare properties related to the first document to the plurality of document editing rules;

determine, based on the comparison, that the first document fails to comply with a specific rule from the plurality of document editing rules;

display an indication that the document is not in compliance with the specific rule from the plurality of document editing rules;

determine that the specific rule from the plurality of document editing rules is mandatory, and, when the specific rule is mandatory:

automatically apply, without user input, based on a set of enterprise characteristics associated with the first document and the one or more properties related to the first document, the specific rule to change the first document; and require a document change associated with the specific rule to be made prior to allowing any subsequent document action.

17. The system of claim 16, wherein the processor is further responsive to the computer-executable instructions and operative to:

associate trackable consumption-based analytics metadata to at least one of the properties related to the first document;

receive feedback related to a consumption of the first document amongst a consumption group; and receive an indication of an impact that at least one of the properties related to the first document has on the consumption of the first document amongst the consumption group.

18. The system of claim 17, wherein the processor is further responsive to the computer-executable instructions and operative to:

determine that one or more document properties related to one or more documents are the same as at least one of the properties related to the first document;

determine the impact that the one or more document properties related to the one or more documents has on a consumption of the one or more documents amongst the consumption group; and provide a recommendation to make a document change in the first document based on the determined impact that the one or more document properties related to the one or more documents has on the consumption of the one or more documents.

19. The system of claim 16, wherein the processor is further responsive to the computer-executable instructions and operative to:

inspect a plurality of documents having one or more properties that are the same as the one or more properties related to the first document;

receive feedback related to a consumption of the plurality of documents amongst a consumption group;

receive an indication of an impact that at least one of the properties has on the consumption of the plurality of documents amongst the consumption group; and provide an indication of the impact that at least one of the properties has on the consumption of the plurality of documents amongst the consumption group.

* * * * *